US012744696B2

(12) United States Patent
Li

(10) Patent No.: US 12,744,696 B2
(45) Date of Patent: Sep. 22, 2026

(54) SIGNAL PROCESSING METHOD AND APPARATUS

(71) Applicant: HUAWEI TECHNOLOGIES CO., LTD., Shenzhen (CN)

(72) Inventor: Qiang Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 17 days.

(21) Appl. No.: 19/061,750

(22) Filed: Feb. 24, 2025

(65) Prior Publication Data

US 2025/0193059 A1 Jun. 12, 2025

Related U.S. Application Data

(63) Continuation of application No. PCT/CN2023/114214, filed on Aug. 22, 2023.

(30) Foreign Application Priority Data

Aug. 26, 2022 (CN) ......................... 202211033204.6
Nov. 11, 2022 (CN) ......................... 202211415615.1

(51) Int. Cl.
*H04L 27/20* (2006.01)
*H04L 5/00* (2006.01)

(52) U.S. Cl.
CPC ........ *H04L 27/2025* (2013.01); *H04L 5/0007* (2013.01)

(58) Field of Classification Search
CPC ...... H04B 1/04; H04B 7/0413; H04B 10/116; H04J 1/00; H04J 11/00; H04L 1/00;
(Continued)

(56) References Cited

U.S. PATENT DOCUMENTS 8,654,625 B2 * 2/2014 Kwon .................. H04L 5/0051 370/328
10,797,929 B2 * 10/2020 Wilhelmsson .......... H04L 27/10
(Continued)

FOREIGN PATENT DOCUMENTS

CN 110235420 A 9/2019
WO 2021081831 A1 5/2021

OTHER PUBLICATIONS

Branimir Stantchev et al. an Integrated FSK-Signaling Scheme for OFDM-Basedadvanced Cellular Radio, 1997 IEEE 47th. Vehicular Technology Conference. Phoenix, May 4, 1997, total 5 pages.
(Continued)

*Primary Examiner* — Shawkat M Ali
(74) *Attorney, Agent, or Firm* — Rimon PC

(57) ABSTRACT

Embodiments of this application provide a signal processing method and apparatus. A sending device sends a first symbol and modulates a phase of a second symbol based on a first phase, a second frequency, and a second duration. The second symbol is the next symbol after the first symbol. The first phase is a phase at the end of the first symbol. The second frequency is a transmission frequency used for the second symbol, and the second duration is a duration of a cyclic prefix of the second symbol. The sending device sends a modulated second symbol by using the second frequency, where phases between the modulated second symbol and the first symbol are continuous. This avoids a phase jump, and therefore reduces interference caused by a transmitted signal to a signal transmitted on an adjacent frequency band.

20 Claims, 16 Drawing Sheets

(58) Field of Classification Search
CPC ......... H04L 5/00; H04L 5/0007; H04L 25/03; H04L 27/02; H04L 27/10; H04L 27/20; H04L 27/26; H04L 27/34; H04L 27/2025; H04W 48/08; H04W 72/04; H04W 72/10
USPC ........ 370/329, 335; 375/219, 260, 267, 295, 375/300, 316
See application file for complete search history.

(56) References Cited

U.S. PATENT DOCUMENTS 12,301,397 B2 * 5/2025 Ma ...................... H04L 27/2607
2020/0162306 A1 5/2020 Wilhelmsson et al.

OTHER PUBLICATIONS

Jaap Van De Beek et al: “N-continuous OFDM”, IEEE Communications Letters, IEEE Service Center, Piscataway, NJ, US, vol. 13, No. 1, Jan. 1, 2009, total 3 pages.

* cited by examiner

SIGNAL PROCESSING METHOD AND APPARATUS

CROSS-REFERENCE TO RELATED APPLICATION

This application is a continuation of International Application No. PCT/CN2023/114214, filed on Aug. 22, 2023, which is a continuation of International application No. 202211033204.6, filed on Aug. 26, 2022 and Chinese Patent Application No. 202211415615.1, filed on Nov. 11, 2022. All of the aforementioned patent applications are incorporated herein by reference in their entireties.

TECHNICAL FIELD

Embodiments of this application relate to the communication field, and more specifically, to a signal processing method and apparatus.

BACKGROUND

In a wireless communication system, a signal is radiated through space in the form of an electromagnetic wave via an antenna. The sending device usually uses a pre-allocated carrier frequency to transmit the signal, where the main energy of the signal is expected to be within an allocated bandwidth. However, during actual transmission of the signal, a spectrum of the actual waveform of the signal may exceed the allocated bandwidth range. Consequently, severe interference is caused to a signal transmitted on an adjacent frequency band, so that transmission of the signal on the adjacent frequency band is affected.

SUMMARY

Embodiments of this application provide a signal processing method and apparatus, to reduce interference caused by a transmitted signal to a signal transmitted on an adjacent frequency band.

According to a first aspect, a signal processing method is provided. The method may be performed by a transmit-end device (for example, a terminal device, or for another example, a network device), or may be performed by a component (for example, a chip or a circuit) of a transmit-end device. This is not limited.

The method may include: sending a first symbol; modulating a phase of a second symbol based on a first phase, a second frequency, and a second duration, where the second symbol is a next symbol after the first symbol, the first phase is a phase at the end of the first symbol, the second frequency is a transmission frequency used for the second symbol, and the second duration is a duration of a cyclic prefix of the second symbol; and sending a modulated second symbol by using the second frequency, where phases between the modulated second symbol and the first symbol are continuous.

According to the foregoing technical solution, the transmit-end device may modulate the phase of the second symbol based on the phase at the end of the first symbol, the transmission frequency used for the second symbol, and the duration of the cyclic prefix of the second symbol, so that the phase of the second symbol changes. In this way, when the modulated second symbol is sent by using the second frequency, the phases between the modulated second symbol and the first symbol are continuous. This avoids a phase jump, and therefore reduces interference caused by a transmitted signal to a signal transmitted on an adjacent frequency band.

In some embodiments of this application, the transmit-end device may determine a third phase based on the first phase, the second frequency, and the second duration, determine a modulated symbol based on the third phase, and use the second frequency to carry the modulated symbol. A magnitude of a phase (namely, the third phase) of the modulated symbol is equal to a magnitude of a phase of the modulated second symbol.

For example, the first phase may be expressed as $\varphi(t_{end,\ n-1})$, the second frequency may be expressed as $f_n$, and the second duration may be expressed as $T_{cp,n}$ In this case, the third phase may be expressed as follows: $\varphi_n=\varphi(t_{end,\ n-1})+2\pi f_n T_{cp,n}$. Further, the modulated symbol may be expressed as $$a_n e^{j\varphi_n}.$$

In some embodiments of this application, the first phase is determined based on a second phase, a first frequency, and a first duration, the second phase is a phase of the first symbol, the first frequency is a transmission frequency used for the first symbol, and the first duration is a remaining duration of the first symbol without a cyclic prefix.

For example, the second phase may be expressed as $\varphi_{n-1}$, the first frequency may be expressed as $f_{n-1}$, and the first duration may be expressed as $T_{OS}$. In this case, the first phase may be expressed as follows: $\varphi(t_{end,\ n-1})=\varphi_{n-1}+2\pi f_{n-1}T_{os}$. Further the third phase may be expressed as follows: $\varphi_n=\varphi_{n-1}+2\pi f_{n-1}T_{os}+2\pi f_n T_{cp,n}$.

In some embodiments of this application, the first phase is the same as a second phase, and the second phase is a phase of the first symbol.

For example, the first phase may be expressed as follows: $\varphi(t_{end,\ n-1})=\varphi_{n-1}$. Further, the third phase may be expressed as follows: $\varphi_n=\varphi_{n-1}+2\pi f_n T_{cp,n}$.

In some embodiments of this application, the second frequency is determined based on data that is to be sent.

For example, an FSK signal may be carried at the second frequency. If a modulation order of the FSK signal is 2, one symbol may carry one-bit information. In this case, if bits of to-be-transmitted information include a sequence including "0" and "1", sending a first signal whose frequency is $f_0$ may indicate that "0" is transmitted, and sending a second signal whose frequency is $f_1$ may indicate that "1" is transmitted. The transmit-end device may determine, based on whether data that needs to be sent is 0 or 1, whether the second frequency is $f_0$ or $f_1$.

In some embodiments of this application, the first symbol and the second symbol are orthogonal frequency division multiplexing OFDM symbols.

According to a second aspect, a signal processing method is provided. The method may be performed by a transmit-end device (for example, a terminal device, or for another example, a network device), or may be performed by a component (for example, a chip or a circuit) of a transmit-end device. This is not limited.

The method may include: sending a first symbol; generating a frequency-gradient signal based on a first phase, a first frequency, and a second frequency, where the first phase is a phase at the end of the first symbol, the first frequency is a transmission frequency used for the first symbol, the second frequency is a transmission frequency used for a second symbol, and the second symbol is a next symbol after the first symbol; and sending a third symbol, where the third symbol includes the frequency-gradient signal and the second symbol, the second symbol is connected to the first symbol through the frequency-gradient signal, and frequencies between the third symbol and the first symbol are continuous.

For example, the frequency-gradient signal may be at a location of a cyclic prefix CP of the third symbol.

According to the foregoing technical solution, the transmit-end device may generate the frequency-gradient signal based on the phase at the end of the first symbol, the transmission frequency used for the first symbol, and the transmission frequency used for the second symbol, the sent third symbol includes the frequency-gradient signal and the second symbol, and the first symbol and the second symbol are connected through the frequency-gradient signal. This can implement smooth switching from a frequency of the first symbol to a frequency of the third symbol. In other words, a frequency smoothly switches from a frequency of a previous symbol to a frequency of a current symbol, to ensure frequency continuity and avoid a frequency jump, so that interference caused by a signal under transmission to a signal transmitted on an adjacent frequency band can be reduced.

In some embodiments of this application, the frequency-gradient signal is determined based on a frequency-gradient sequence, the frequency-gradient sequence is determined based on an instantaneous frequency function and the first phase, the instantaneous frequency function is obtained based on a gradient frequency function, and the gradient frequency function is determined based on the first frequency, the second frequency, and a duration of a cyclic prefix of the second symbol.

According to the foregoing technical solution, the transmit-end device may determine the gradient frequency function based on the transmission frequency used for the first symbol, the transmission frequency used for the second symbol, and the duration of the cyclic prefix of the second symbol, and obtain the instantaneous frequency function based on the gradient frequency function, and therefore may determine the frequency-gradient sequence based on the instantaneous frequency function and the first phase. The frequency-gradient sequence may be set at a location of the CP of the second symbol, so that the transmit-end device can generate the frequency-gradient signal based on the frequency-gradient sequence.

In some embodiments of this application, the first phase is determined based on a second phase, a first frequency, and a first duration, the second phase is a phase of the first symbol, the first frequency is a transmission frequency used for the first symbol, and the first duration is a remaining duration of the first symbol without a cyclic prefix.

For example, the second phase may be expressed as $\varphi_{n-1}$, the first frequency may be expressed as $f_{n-1}$, and the first duration may be expressed as $T_{OS}$. In this case, the first phase may be expressed as follows: $\varphi(t_{end,\ n-1})=\varphi_{n-1}+2\pi f_{n-1}T_{os}$.

In some embodiments of this application, the first phase is the same as a second phase, and the second phase is a phase of the first symbol.

For example, the first phase may be expressed as follows: $\varphi(t_{end,\ n-1})=\varphi_{n-1}+2\pi f_{n-1}T_{os}$.

In some embodiments of this application, the gradient frequency function includes any one of the following: a cosine function, a transformed function of a cosine function, or a hyperbolic tangent function.

In some embodiments of this application, the first symbol and the second symbol are orthogonal frequency division multiplexing OFDM symbols.

According to a third aspect, a signal processing method is provided. The method may be performed by a transmit-end device (for example, a terminal device, or for another example, a network device), or may be performed by a component (for example, a chip or a circuit) of a transmit-end device. This is not limited.

The method may include: generating a frequency shift keying FSK signal based on a square wave signal, a first amplitude, and a second amplitude, where the square wave signal is obtained by mapping data that needs to be sent, the data that needs to be sent includes first data and second data, the first data and the second data are to be sent adjacently in sequence, the first amplitude is an amplitude obtained by mapping the first data, and the second amplitude is an amplitude obtained by mapping the second data; and sending the FSK signal.

According to the foregoing technical solution, the transmit-end device may generate the FSK signal based on the square wave signal, the first amplitude, and the second amplitude. For example, the transmit-end device may generate the FSK signal based on the square wave signal and amplitudes obtained by mapping two pieces of data that are to be sent adjacently in sequence. A frequency of the FSK signal changes smoothly, so that a signal frequency jump can be avoided, and interference caused by a signal under transmission to a signal transmitted on an adjacent frequency band is reduced.

In some embodiments of this application, the FSK signal is determined based on a first phase signal, the first phase signal is obtained through integration based on a first signal, the first signal includes the square wave signal and a gradient signal, and the gradient signal is determined based on the first amplitude, the second amplitude, and a time length of the gradient signal.

According to the foregoing technical solution, the transmit-end device may determine the gradient signal based on the first amplitude, the second amplitude, and the time length of the gradient signal, and therefore may determine the first signal based on the gradient signal and the square wave signal, perform integration on the first signal to obtain the first phase signal, and then determine the FSK signal based on the first phase signal. It can be understood that the FSK signal is generated based on the square wave signal and the gradient signal, and the gradient signal may be inserted between square wave signals with different amplitudes, to avoid a signal jump, and reduce interference caused by a signal under transmission to a signal transmitted on an adjacent frequency band.

In some embodiments of this application, the FSK signal meets the following formula:

$$s_{FSK}(t)=\cos\left(2\pi h\int_{-\infty}^{t}v_f(\tau)d\tau\right),$$

$s_{FSK}(t)$ indicates the FSK signal at a moment t, $v_f(\tau)$ indicates the first signal, and h is a constant.

In some embodiments of this application, the square wave signal is obtained by mapping, in the following manner, data that needs to be sent: mapping, to one amplitude based on a preset mapping table, every N bits in the data that needs to be sent; and determining the square wave signal based on an amplitude obtained through mapping, where $N=\log_2 M$, M is a modulation order of the FSK signal, and N is a natural number.

For example, it is assumed that FSK modulation with M=2 is used, and the data that needs to be sent is a=[0, 1, 1, 0]. In this case, every $N=\log_2 M$ bits are mapped to one amplitude value. In other words, one bit is mapped to one amplitude value. For example, a mapping relationship table is as follows: When an information bit is 0, a mapped-to amplitude is −1; and when an information bit is 1, a mapped-to amplitude is 1. In this case, an amplitude sequence obtained through mapping is as follows: v=[−1, 1, 1, −1].

According to a fourth aspect, a signal processing method is provided. The method may be performed by a receive-end device (for example, a terminal device), or may be performed by a component (for example, a chip or a circuit) of a receive-end device. This is not limited.

The method may include: receiving a first symbol; receiving a modulated second symbol, where phases between the modulated second symbol and the first symbol are continuous, and the modulated second symbol is a next symbol after the first symbol; and demodulating the modulated second symbol based on a second frequency, where the second frequency is a transmission frequency used for the second symbol. The modulated second symbol is obtained by modulating a second symbol based on a first phase, the second frequency, and a second duration. The first phase is a phase at the end of the first symbol. The second duration is a duration of a cyclic prefix of the second symbol.

The first symbol and the second symbol may be orthogonal frequency division multiplexing OFDM symbols. The OFDM symbols carry an FSK signal.

According to the foregoing technical solution, after receiving the modulated second symbol, the receive-end device may demodulate the second symbol based on the second frequency by using a demodulation technology, to obtain information sent by a transmit-end device.

In some embodiments of this application, the first phase is determined based on a second phase, a first frequency, a and first duration, the second phase is a phase of the first symbol, the first frequency is a transmission frequency used for the first symbol, and the first duration is a remaining duration of the first symbol without a cyclic prefix.

In some embodiments of this application, the first phase is the same as a second phase, and the second phase is a phase of the first symbol.

In some embodiments of this application, the second frequency is determined based on data that is next to be sent.

According to a fifth aspect, a signal processing method is provided. The method may be performed by a receive-end device (for example, a terminal device), or may be performed by a component (for example, a chip or a circuit) of a receive-end device. This is not limited.

The method may include: receiving a first symbol; and receiving a third symbol, where the third symbol includes a frequency-gradient signal and a second symbol, the second symbol is connected to the first symbol through the frequency-gradient signal, frequencies between the third symbol and the first symbol are continuous, the frequency-gradient signal is generated based on a first phase, a first frequency, and a second frequency, the first phase is a phase at the end of the first symbol, the first frequency is a transmission frequency used for the first symbol, the second frequency is a transmission frequency used for the second symbol, and the second symbol is a next symbol after the first symbol; and demodulating the second symbol based on the second frequency.

The first symbol and the second symbol are orthogonal frequency division multiplexing OFDM symbols.

According to the foregoing technical solution, after receiving the third symbol, the receive-end device may obtain the second symbol from the third symbol, and demodulate the second symbol based on the second frequency by using a demodulation technology, to obtain information sent by a transmit-end device.

In some embodiments of this application, the frequency-gradient signal is determined based on a frequency-gradient sequence, the frequency-gradient sequence is determined based on an instantaneous frequency function and the first phase, the instantaneous frequency function is obtained based on a gradient frequency function, and the gradient frequency function is determined based on the first frequency, the second frequency, and a duration of a cyclic prefix of the second symbol.

In some embodiments of this application, the first phase is determined based on a second phase, the first frequency, and a first duration, the second phase is a phase of the first symbol, and the first duration is a remaining duration of the first symbol without a cyclic prefix.

In some embodiments of this application, the first phase is the same as a second phase, and the second phase is a phase of the first symbol.

In some embodiments of this application, the gradient frequency function includes any one of the following: a cosine function, a transformed function of a cosine function, or a hyperbolic tangent function.

According to a sixth aspect, a signal processing method is provided. The method may be performed by a receive-end device (for example, a terminal device), or may be performed by a component (for example, a chip or a circuit) of a receive-end device. This is not limited.

The method may include: receiving an FSK signal, where the FSK signal is generated based on a square wave signal, a first amplitude, and a second amplitude, the square wave signal is obtained by mapping data that needs to be sent, the data that needs to be sent includes first data and second data, the first data and the second data are sent adjacently in sequence, the first amplitude is an amplitude obtained by mapping the first data, and the second amplitude is an amplitude obtained by mapping the second data; and demodulating the FSK signal based on a third frequency, where the third frequency is directly proportional to an amplitude of the square wave signal.

According to the foregoing technical solution, after receiving the FSK signal, the receive-end device may demodulate the FSK signal based on the third frequency by using a demodulation technology, to obtain information sent by a transmit-end device.

In some embodiments of this application, the FSK signal is determined based on a first phase signal, the first phase signal is obtained through integration based on a first signal, the first signal includes the square wave signal and a gradient signal, and the gradient signal is determined based on the first amplitude, the second amplitude, and a time length of the gradient signal.

In some embodiments of this application, the FSK signal meets the following formula:

$$s_{FSK}(t) = \cos\left(2\pi h \int_{-\infty}^{t} v_f(\tau)d\tau\right),$$

$s_{FSK}(t)$ indicates the FSK signal at a moment t, $v_f(\tau)$ indicates the first signal, and h is a constant.

In some embodiments of this application, the square wave signal is obtained by mapping, in the following manner, the data that needs to be sent: mapping, to one amplitude based on a preset mapping table, every N bits in the data that needs to be sent; and determining the square wave signal based on an amplitude obtained through mapping, where $N=\log_2 M$, M is a modulation order of the FSK signal, and N is a natural number.

According to a seventh aspect, a signal processing apparatus is provided. The apparatus is configured to perform the method according to any one of the possible implementations of the first aspect to the third aspect. The apparatus may include a unit and/or a module for performing the method according to any one of the possible implementations of the first aspect to the third aspect.

In a possible implementation, the apparatus may include a transceiver unit and a processing unit. The transceiver unit is configured to send a first symbol. The processing unit is configured to modulate a phase of a second symbol based on a first phase, a second frequency, and a second duration, where the second symbol is a next symbol after the first symbol, the first phase is a phase at the end of the first symbol, the second frequency is a transmission frequency used for the second symbol, and the second duration is a duration of a cyclic prefix of the second symbol. The transceiver unit is further configured to send a modulated second symbol by using the second frequency, where phases between the modulated second symbol and the first symbol are continuous.

In a possible implementation, the apparatus may include a transceiver unit and a processing unit. The transceiver unit is configured to send a first symbol. The processing unit is configured to generate a frequency-gradient signal based on a first phase, a first frequency, and a second frequency, where the first phase is a phase at the end of the first symbol, the first frequency is a transmission frequency used for the first symbol, the second frequency is a transmission frequency used for a second symbol, and the second symbol is a next symbol after the first symbol. The transceiver unit is further configured to send a third symbol, where the third symbol includes the frequency-gradient signal and the second symbol, the second symbol is connected to the first symbol through the frequency-gradient signal, and frequencies between the third symbol and the first symbol are continuous.

In a possible implementation, the apparatus may include a transceiver unit and a processing unit. The processing unit is configured to generate a frequency shift keying FSK signal based on a square wave signal, a first amplitude, and a second amplitude, where the square wave signal is obtained by mapping data that needs to be sent, the data that needs to be sent includes first data and second data, the first data and the second data are to be sent adjacently in sequence, the first amplitude is an amplitude obtained by mapping the first data, and the second amplitude is an amplitude obtained by mapping the second data. The transceiver unit is configured to send the FSK signal.

According to an eighth aspect, a signal processing apparatus is provided. The apparatus includes at least one processor, configured to execute a computer program or instructions stored in a memory, to perform the method according to any one of the possible implementations of the first aspect to the third aspect. In some embodiments, the apparatus further includes the memory, configured to store the computer program or instructions. In some embodiments, the apparatus further includes a communication interface, and the processor reads, through the communication interface, the computer program or instructions stored in the memory.

In an implementation, the apparatus is a communication device (for example, a transmit-end device, or for another example, a receive-end device).

In another implementation, the apparatus is a chip, a chip system, or a circuit used in a communication device (for example, a transmit-end device, or for another example, a receive-end device).

In some embodiments, the transmit-end device is a network device or a terminal device.

In some embodiments, the receive-end device is a terminal device.

According to a ninth aspect, this application provides a processor, configured to perform the methods according to the foregoing aspects.

Sending, obtaining/receiving, and other operations related to the processor may be understood as output, receiving/input, and other operations performed by the processor, or sending and receiving operations performed by a radio frequency circuit and an antenna, unless otherwise specified or the operations conflict with actual functions or internal logic of the operations in related descriptions. This is not limited in this application.

According to a tenth aspect, a computer-readable storage medium is provided. The computer-readable storage medium stores program code to be executed by a device. The program code is used for performing the method according to any one of the possible implementations of the first aspect to the third aspect.

According to an eleventh aspect, a computer program product including instructions is provided. When the computer program product is run on a computer, the computer is enabled to perform the method according to any one of the possible implementations of the first aspect to the third aspect.

According to a twelfth aspect, a communication system is provided, including the transmit-end device and the receive-end device described above.

DESCRIPTION OF EMBODIMENTS

Figure 1:
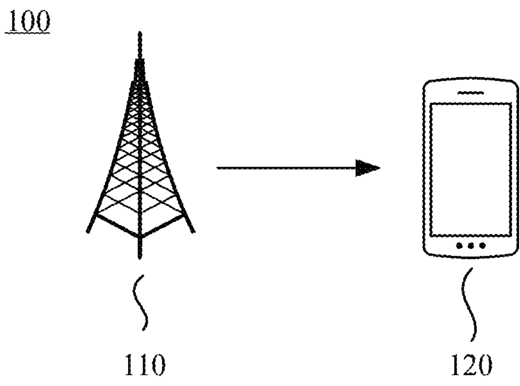
FIG. 1 is a diagram of a wireless communication system to which embodiments of this application are applicable.

The following describes technical solutions in embodiments of this application with reference to accompanying drawings.

For ease of understanding the embodiments of this application, the following descriptions are provided before embodiments of this application are recited.

First, in embodiments of this application, “first”, “second”, and various numbers are merely intended for distinguishing elements for ease of description, and are not intended to limit the scope of embodiments of this application. Sequence numbers of the following processes do not indicate an execution sequence. The execution sequence of the processes should be determined based on functions and internal logic of the processes, and should not be construed as any limitation on an implementation process of embodiments of this application. In addition, the terms “1010”, “1410”, “1710”, and the like are merely identifiers for ease of description, and are not intended to limit an execution sequence of operations.

Second, in embodiments of this application, the descriptions “when . . . ”, “in a case that . . . ”, “if”, and the like all mean that a device performs corresponding processing in an objective case, but are not intended to limit time. The descriptions do not necessarily mean that the device performs a determining action during implementation, and do not mean any other limitation. In embodiments of this application, the term “example”, “for example”, or the like is used to give an example, an illustration, or a description. Any embodiment or design scheme described as an “example” or “for example” in this application should not be construed as being more preferred or more advantageous than another embodiment or design scheme. To be precise, the term “example”, “for example”, or the like is intended to present a related concept in an example manner.

Third, durations mentioned in this application, for example, a duration of a cyclic prefix and a duration of a symbol, indicates a time length. For example, a unit of the duration (namely, the time length) mentioned in this specification may be as follows: $T_c=1/(4096 \cdot 480 \cdot 10^3)$ seconds. For another example, the time length may alternatively be represented by a quantity of time-domain sampling points. This is not limited.

The technical solutions provided in this application may be used in various communication systems, for example, a 5th generation (5G) or new radio (NR) system, a long term evolution (LTE) system, an LTE frequency division duplex (FDD) system, and an LTE time division duplex (TDD) system. The technical solutions provided in this application may be further used in a future communication system, for example, a 6th generation (6G) mobile communication system. The technical solutions provided in this application may be further used in device-to-device (D2D) communication, vehicle-to-everything (V2X) communication, machine-to-machine (M2M) communication, machine type communication (MTC), an internet of things (IoT) communication system, or another communication system.

A terminal device in embodiments of this application may also be referred to as a user equipment (UE), an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice or data for a user, for example, a handheld device or a vehicle-mounted device with a wireless connection function. Currently, some examples of the terminal are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a hand-held device with a wireless communication function, a computing device or another processing device connected to a wireless modem, a wearable device, a terminal device in a 5G network, or a terminal device in a future evolved public land mobile network (PLMN). This is not limited in embodiments of this application.

As an example rather than a limitation, in embodiments of this application, the terminal device may alternatively be a wearable device. The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but further implements a powerful function through software support, data exchange, and cloud-based interaction. In a broad sense, wearable intelligent devices include full-featured and large-sized devices that can implement complete or partial functions without relying on smartphones, for example, smartwatches or smart glasses, and devices that focus only on one type of application function and need to be used together with other devices such as smartphones, for example, various smart bands or smart jewelry used for monitoring physical signs.

In embodiments of this application, an apparatus for implementing a function of a terminal device may be a terminal device, or may be an apparatus, for example, a chip system or a chip, that can enable a terminal device to implement the function, where the apparatus may be installed in the terminal device. In embodiments of this application, the chip system may include a chip, or may include a chip and another discrete component.

A network device in embodiments of this application may be a device configured to communicate with the terminal device. The network device may also be referred to as an access network device or a radio access network device. For example, the network device may be a base station. The network device in embodiments of this application may be a radio access network (RAN) node (or device) that connects the terminal device to a wireless network. The base station may cover any of the following names in a broad sense, or may be replaced with the following names: for example, a NodeB, an evolved NodeB (eNB), a next generation NodeB (gNB), a relay station, an access point, a transmitting and receiving point (TRP), a transmitting point (TP), a master station, a secondary station, a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. The base station may alternatively be a communication module, a modem, or a chip that is disposed in the foregoing device or apparatus. The base station may alternatively be a mobile switching center, a device that performs a function of a base station in D2D, V2X, or M2M communication, a network-side device in a 6G network, a device that performs a function of a base station in a future communication system, or the like. The base station may support networks of a same access technology or different access technologies. A specific technology and a specific device form that are used by the network device are not limited in embodiments of this application.

The base station may be fixed or mobile. For example, a helicopter or an uncrewed aerial vehicle may be configured as a mobile base station, and one or more cells may move based on a position of the mobile base station. In other examples, a helicopter or an uncrewed aerial vehicle may be configured as a device for communicating with another base station.

In some deployments, the network device mentioned in embodiments of this application may be a device including a CU or a DU, a device including a CU and a DU, or a device including a control plane CU node (a central unit-control plane (CU-CP)), a user plane CU node (a central unit-user plane (CU-UP)), and a DU node.

The network device and the terminal device may be deployed on land, including an indoor or outdoor scenario and a handheld or vehicle-mounted scenario, or may be deployed on water, or may be deployed on an airplane, a balloon, and a satellite in the air. Scenarios in which the network device and the terminal device are located are not limited in embodiments of this application.

First, a network architecture to which this application is applicable is briefly described with reference to FIG. 1 and FIG. 2.

FIG. 1 is a diagram of a wireless communication system 100 to which embodiments of this application are applicable. As shown in FIG. 1, the wireless communication system 100 may include at least one network device, for example, a network device 110 shown in FIG. 1. The wireless communication system 100 may further include at least one terminal device, for example, a terminal device 120 shown in FIG. 1. Both the network device and the terminal device may be configured with a plurality of antennas. The network device may send a downlink signal to the terminal device through the plurality of antennas.

Figure 2:
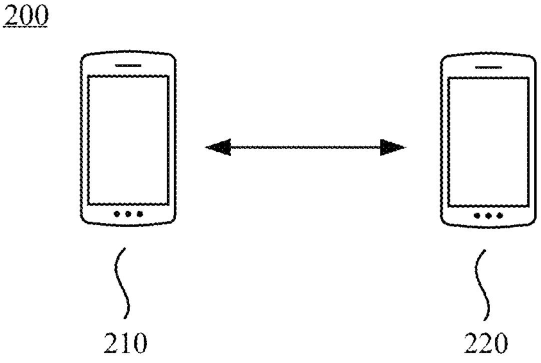
FIG. 2 is a diagram of another wireless communication system to which embodiments of this application are applicable.

FIG. 2 is a diagram of a wireless communication system 200 to which embodiments of this application are applicable. As shown in FIG. 2, the wireless communication system 200 may include a plurality of terminal devices, for example, a terminal device 210 and a terminal device 220 shown in FIG. 2. The wireless communication system 200 may support a sidelink communication technology, and sidelink communication may be performed between a plurality of terminal devices (for example, between the terminal device 210 and the terminal device 220). In other words, different terminal devices may send signals to each other.

It should be understood that FIG. 1 and FIG. 2 are merely simplified diagrams of examples for ease of understanding. The wireless communication system 100 may further include another network device, or may further include another terminal device. The wireless communication system 200 may further include another terminal device. This is not shown in FIG. 1 or FIG. 2. It should be further understood that embodiments of this application are applicable to any communication scenario in which a transmit-end device communicates with a receive-end device.

For ease of understanding embodiments of this application, related technical content in this application is briefly described first.

1. Modulation Technology

A modulation technology is a technology that controls changes in an amplitude, a phase, or a frequency of a carrier based on to-be-sent information, to perform information transmission through the carrier.

2. Demodulation Technology

A demodulation technology is a reverse process of the modulation technology. Usually, a receiving device obtains, from a modulated signal (a signal modulated by a sending device) through a signal processing means, information sent by the sending device.

3. Frequency Shift Keying (FSK) Modulation Technology

The FSK modulation technology is a common modulation technology in wireless communication. The FSK modulation technology is usually used in a communication system with low bandwidth and a low rate (a communication rate is usually below 1 Mbps), for example, a 2G system or Bluetooth. In FSK, to-be-sent information is carried in a frequency of a transmit signal.

Figure 3:
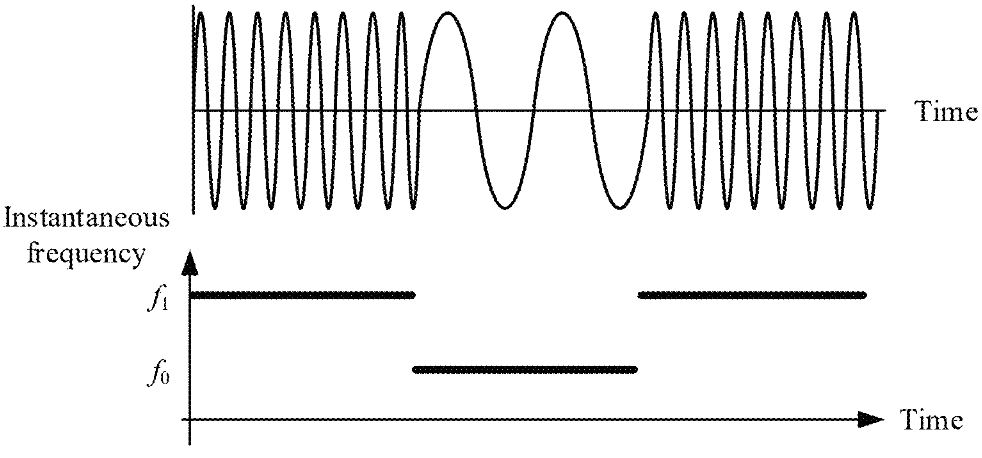
FIG. 3 is a diagram of a waveform of a frequency shift keying FSK-modulated signal.

In an example, FIG. 3 is a diagram of a waveform of an FSK-modulated signal. An upper part of FIG. 3 shows an example FSK waveform. It can be learned that the FSK waveform is similar to a cosine function, but has different frequencies. A lower part of FIG. 3 illustrates an example of a change of an instantaneous frequency of the signal with time. It can be learned that a higher frequency $f_1$ is used in a $1^{st}$ symbol and a $3^{rd}$ symbol, and a lower frequency $f_0$ is used in a $2^{nd}$ symbol.

As shown in FIG. 3, assuming that information bits that need to be transmitted are a sequence including 0 and 1, in a possible manner, sending a signal whose frequency is $f_0$ indicates that a bit “0” is transmitted, and sending a signal whose frequency is $f_1$ indicates that a bit “1” is transmitted. At a receive end, a frequency discriminator circuit may be used to detect a frequency of a received signal. If it is detected that a signal frequency is $f_0$, it is determined that a received bit is 0. If it is detected that a signal frequency is $f_1$, it is determined that a received bit is 1.

The example shown in FIG. 3 may be referred to as 2-FSK. In other words, there are two modulation frequencies (namely, $f_0$ and $f_1$). In this case, one symbol carries one bit. However, FSK may be extended to carry more bits. For example, FSK (4-FSK) modulation may be performed by using four different frequencies. In this case, one symbol may carry two-bit information. For example, $f_0$ represents bits "00", $f_1$ represents bits "01", $f_2$ represents bits "10", and $f_3$ represents bits "11".

It can be understood that a transmit signal of an $n^{th}$ FSK symbol may be expressed as follows: $s_n(t)=\cos(2\pi f_1 t+\varphi_n)$, where $(n-1)\cdot T_{sym}\leq t<n\cdot T_{sym}$, $T_{sym}$ is a length of an FSK symbol, t is time, and $\varphi_n$ is an initial phase of the $n^{th}$ FSK symbol.

The FSK modulation technology has a strong anti-noise capability, a constant envelope, and other advantages. When a signal is modulated through FSK, a structure of a receiver is simple, and costs and power consumption are low. For example, the receiver may perform determining on a received signal by using a simple frequency discriminator circuit. It can be understood that the frequency discriminator circuit usually has quite low costs and power consumption, and is suitable for some terminal devices with low-rate services, for example, an internet of things (IoT) device.

4. Modulation Order

A modulation order is used to calculate a quantity of bits that can be represented by each symbol (code element) of a code pattern. If a modulation order is M, a quantity of bits that can be represented by each symbol (code element) is $\log_2$ M. In other words, one symbol (code element) may carry $\log_2$ M-bit information. In this case, FSK with a modulation order of M may be referred to as M-FSK.

For example, if a modulation order is 2, one symbol (code element) may carry one-bit information. In this case, if bits of to-be-transmitted information include a sequence including "0" and "1", each code element may transmit one bit. Sending an FSK signal whose frequency is $f_0$ may indicate that "0" is transmitted. Sending an FSK signal whose frequency is $f_1$ may indicate that "1" is transmitted.

For another example, if a modulation order is 4, one symbol (code element) may carry two-bit information. In this case, it can be considered that transmitted information is a bit sequence including 0 and 1, and each code element may transmit two bits. Sending an FSK signal whose frequency is $f_0$ may indicate that "00" are transmitted, sending an FSK signal whose frequency is $f_1$ may indicate that "01" are transmitted, sending an FSK signal whose frequency is $f_2$ may indicate that "10" are transmitted, and sending an FSK signal whose frequency is $f_3$ may indicate that "11" are transmitted.

5. Orthogonal Frequency Division Multiplexing (OFDM) Modulation Technology

OFDM is a widely used modulation technology. OFDM modulation is usually used in a mobile broadband system, for example, an 802.11 (Wi-Fi) system, a 4G (LTE) system, or a 5G (NR) system, to provide a high transmission rate by using higher communication bandwidth. In most deployment scenarios, OFDM may provide a transmission rate of at least 1 Mbps.

In OFDM, system bandwidth is divided into a plurality of parallel subcarriers, and data is modulated on each subcarrier for transmission. The subcarriers have different frequencies.

Figure 4:
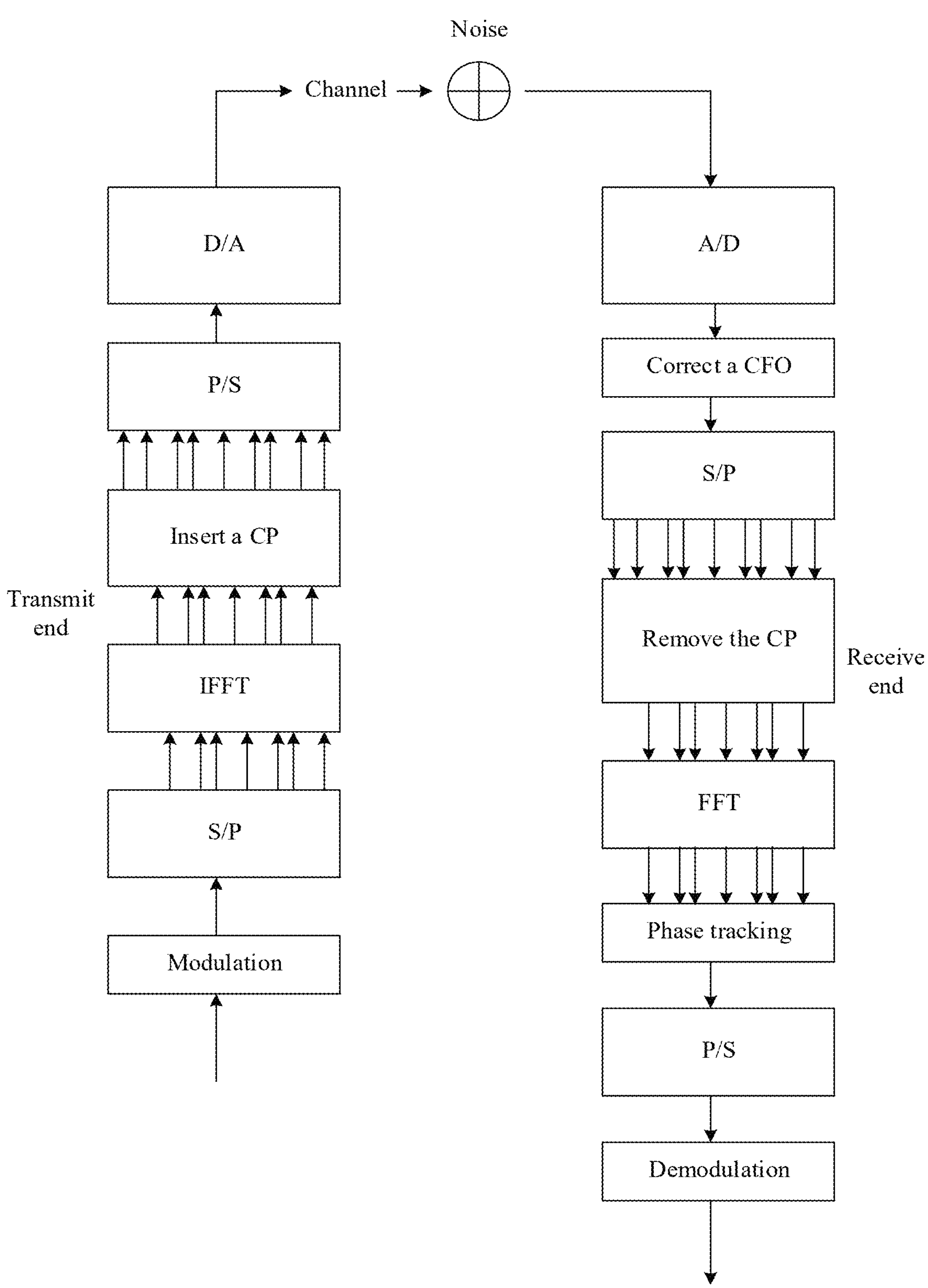
FIG. 4 is a diagram of sending a signal and receiving a signal by using orthogonal frequency division multiplexing (OFDM) modulation technology.

In an example, FIG. 4 is a diagram of sending a signal and receiving a signal by using an OFDM modulation technology.

As shown in FIG. 4, a process of sending a signal by a transmit end may include the following operations. First, an encoded bitstream is modulated and mapped to a complex symbol. The complex symbol may be, for example, $ae^{j\varphi}$, where a is an amplitude of the symbol, and Y is a phase of the symbol. For example, a modulation scheme for modulating the encoded bitstream may be quadrature amplitude modulation (QAM), and an obtained complex symbol is, for example, a QAM symbol. Then serial/parallel (S/P) conversion is performed on a symbol obtained through modulation, and symbols obtained through S/P processing are respectively mapped to different subcarriers. An inverse fast Fourier transform (IFFT) operation is performed on symbols on different subcarriers to convert the symbols into a time-domain sequence. In conventional OFDM symbol processing, a tail part of a time-domain sequence is copied to a front end of a signal to become a cyclic prefix (CP). A main function of the CP is to counteract a multipath transmission delay in an antenna channel. Finally, after CP addition, parallel/serial (P/S) conversion, digital-to-analog conversion (D/A), and up-conversion are performed on a symbol obtained through IFFT, an obtained symbol is transmitted to a channel.

As shown in FIG. 4, a process of receiving a signal by a receive end may include the following operations. Analog-to-digital (A/D) conversion is performed on a received signal, and a carrier frequency offset (CFO) is corrected (correct CFO). Then S/P is performed, and a CP is removed. A fast Fourier transform (FFT) operation is performed on a signal obtained by removing the CP. Then phase tracking is performed, and P/S is performed. Finally, demodulation is performed.

It can be understood that the foregoing processes of sending a signal and receiving a signal are examples for description. This is not limited in this application.

The OFDM modulation technology is used in many current cellular mobile communication networks, for example, 4G LTE and 5G NR. A cellular network is mainly intended to provide mobile broadband (MBB) services, including high-speed Internet access, video browsing, file downloading, and the like by using mobile devices such as mobile phones and a tablet computers.

However, in recent years, cellular networks have evolved to support a broader range of services. Many user devices, for example, IoT devices, wearable devices (for example, a smartwatch), and low-power wakeup links, require low communication rates, but place a high demand on low cost and low power consumption of a receiver. For these devices, OFDM is not a suitable modulation scheme because an OFDM receiver needs to perform precise time-frequency synchronization and complex signal processing, and this requires high cost and power consumption. Therefore, a simpler modulation scheme, for example, an FSK modulation scheme, needs to be considered for these devices.

To serve different types of terminals, a direct approach is as follows: Two transmitters may be disposed on a base station of a mobile communication network. One transmitter is configured to send an OFDM signal to serve a mobile broadband user, and the other transmitter is configured to send an FSK signal to serve a low-rate user. However, in this approach, hardware of an existing network device needs to be upgraded. For example, an FSK transmitter needs to be added on the basis of an existing OFDM transmitter. This increases network deployment costs.

Another approach is as follows: A transmitter uses an existing OFDM transmitter structure, but other modulation waveforms are generated on some frequency bands through some signal processing means. For example, an OFDM transmitter may easily generate an FSK modulation waveform on some frequency bands.

As described above, OFDM includes a plurality of subcarriers, and the subcarriers have different frequencies. Different subcarriers are selected for modulation, and no signal is modulated on other subcarriers. In this case, signals with different frequencies are formed, and an FSK signal is essentially generated. In this way, the OFDM transmitter can be used to generate a waveform of another modulation technology (for example, FSK), provided that only a baseband processing part of the transmitter is upgraded.

6. FSK Modulation Technology Based on an OFDM Transmitter

In the FSK modulation technology based on an OFDM transmitter, an FSK signal is generated based on an OFDM transmitter. This may be implemented by modulating a signal on different subcarriers.

Figure 5:
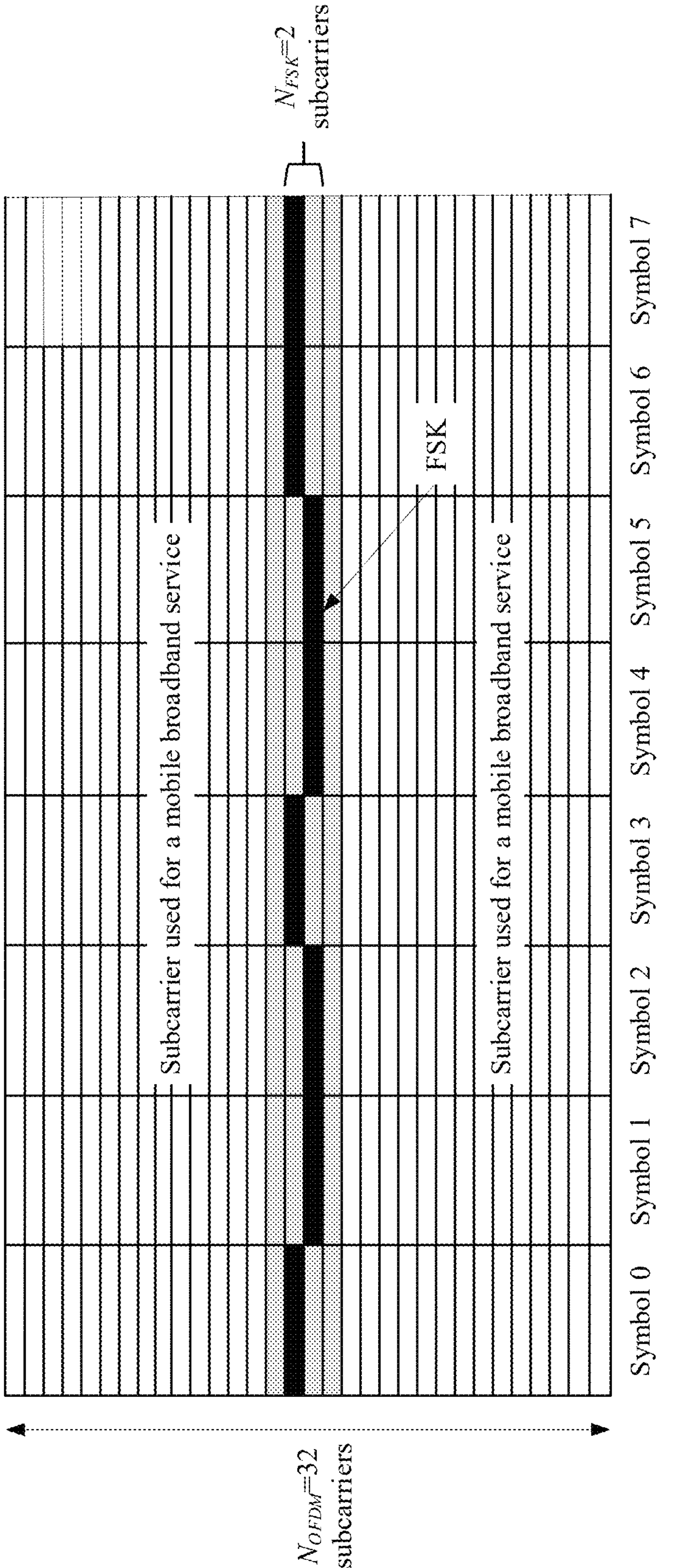
FIG. 5 and FIG. 6 are diagrams of generating an FSK signal based on an OFDM transmitter.
Figure 6:
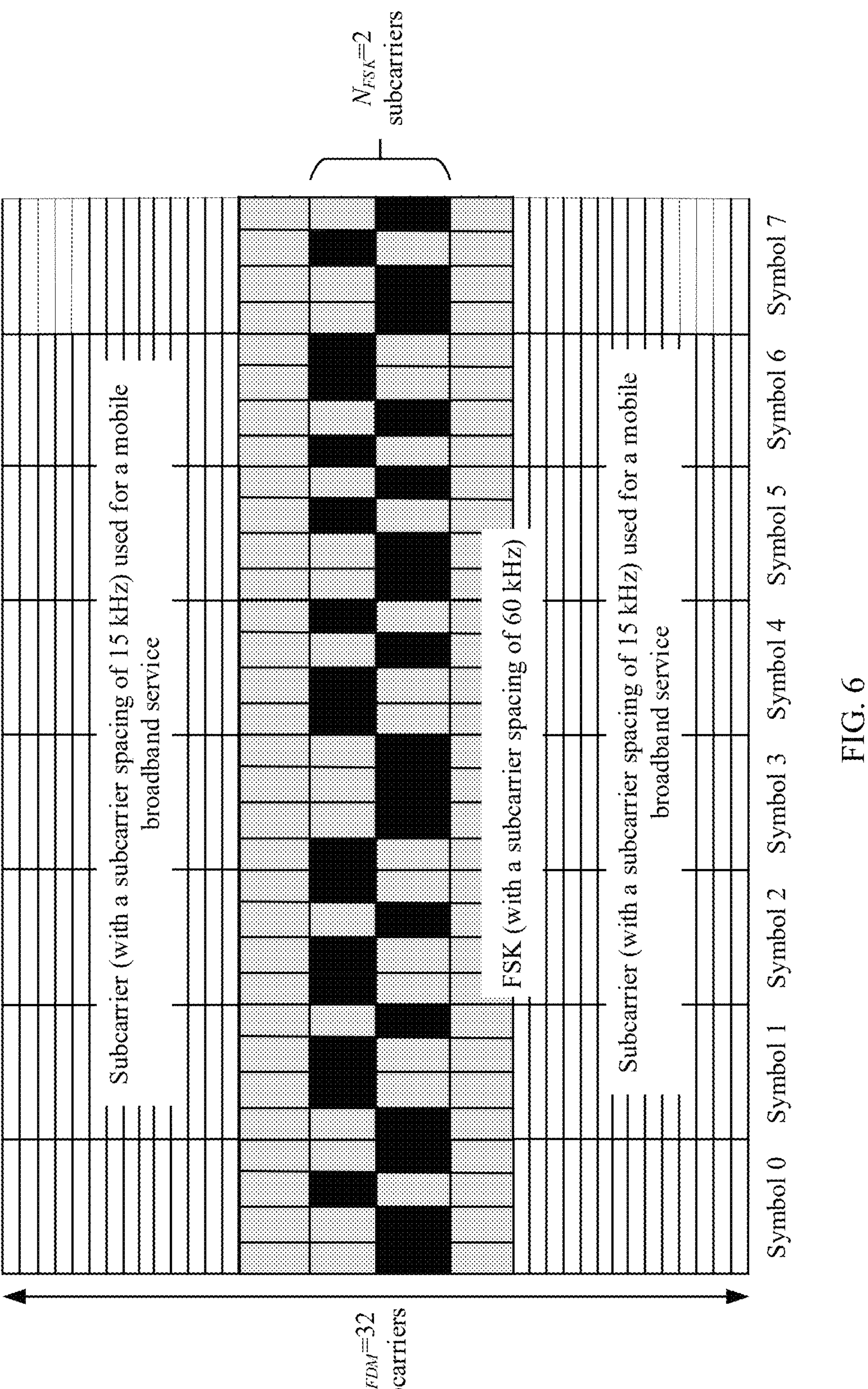

In an example, FIG. 5 and FIG. 6 are diagrams of generating an FSK signal based on an OFDM transmitter. It should be noted that a subcarrier spacing for an FSK signal may be the same as or different from a subcarrier spacing for another OFDM symbol on an adjacent band. In some embodiments, as shown in FIG. 5, on a same carrier, a subcarrier used for a mobile broadband service may have a subcarrier spacing of 15 kHz, and an FSK signal may also have a subcarrier spacing of 15 kHz. In some other embodiments, as shown in FIG. 6, on a same carrier, a subcarrier used for a mobile broadband service may have a subcarrier spacing of 15 kHz, and an FSK signal may have a subcarrier spacing of 60 kHz.

It can be understood that OFDM modulation actually divides a spectrum resource of a system into two-dimensional time-frequency grids. As shown in FIG. 5 and FIG. 6, in a time domain dimension, division is performed by using an OFDM symbol as a granularity; and in a frequency dimension, division is performed by using a subcarrier as a granularity.

It is assumed that the OFDM transmitter uses NOFDM subcarriers. For example, NOFDM=32. NFSK subcarriers are determined from the NOFDM subcarriers for generating an FSK modulation signal, where NFSKSNOFDM, for example, NFSK-2 (to be specific, the NFSK subcarriers are subcarriers at positions marked as black in FIG. 5 or FIG. 6). It is assumed that frequencies of the two subcarriers are $f_0$ and $f_1$ respectively. Other subcarriers may still be used for normal OFDM signals, for example, used to serve a mobile broadband service. In this way, a transmit end may still generate an OFDM signal by using the OFDM transmitter. However, at a receive end, if a narrowband filter is used, a signal obtained by only filtering bandwidth of the NESK subcarriers in the signal is an FSK signal.

The foregoing is an example for description. This is not limited in this application.

In some embodiments, on an $n^{th}$ OFDM, a frequency $f_n$ is selected based on an information bit that needs to be transmitted, and a complex symbol is modulated on a subcarrier with $f_n \in =\{f_0, f_1\}$ and is denoted as $s_n = a_n e^{j\varphi_n}$. If data modulated on another subcarrier is not considered (or it is considered that the modulated data is 0, because the data is filtered out at a receive end), after FFT is performed, an expression of a time-domain signal is as follows:

$$s_n(t) = a_n e^{j\varphi_n} e^{j[2\pi f_n(t - T_{cp} - t_{start,n})]},\ t_{start,n} \le t < t_{end,n} \quad \text{(Formula 1)}$$

$T_{cp}$ is a length of a cyclic prefix, and $t_{start,\ n}$ and $t_{end,\ n}$ are start time and end time of the $n^{th}$ OFDM symbol respectively. It should be noted that, other subcarriers used for mobile broadband are not considered herein, because signals on other subcarriers may be filtered out by using a filter at the receive end.

It can be learned from the formula 1 that the signal is a single-frequency signal, and a frequency of the signal is $f_n$. Therefore, time-domain signals with different frequencies can be formed by modulating the complex symbol on different subcarriers, to form an FSK signal.

It can be further learned from the formula 1 that, at end time ($t_{cp,end} = t_{start,n} + T_{cp}$) of the CP, an expression of the FSK signal is as follows:

$$s_n(t_{start,n} + T_{cp}) = a_n e^{j\varphi_n} \quad \text{(Formula 2)}$$

It can be learned from the formula 2 that, at a time point at which the CP ends, a phase $\varphi_n$ of the time-domain signal is the same as a phase of a modulated complex signal.

It can be learned from the foregoing content that, when an OFDM transmitter is used to generate an FSK signal, the following two problems may exist.

A first problem is that phases between symbols of an FSK signal may be discontinuous. This is because a cyclic prefix is added to an OFDM symbol, causing additional phase rotation. In this case, phases between adjacent symbols may be discontinuous.

Figure 7:
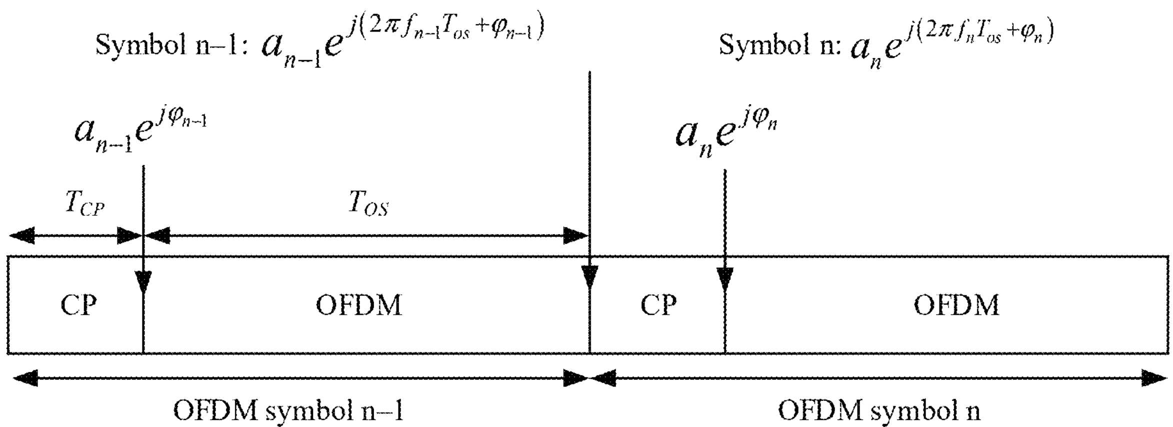
FIG. 7 is a diagram of phase analysis for generating an FSK signal based on an OFDM transmitter.

In an example, FIG. 7 is a diagram of phase analysis for generating an FSK signal based on an OFDM transmitter. FIG. 7 shows two OFDM symbols, and modulation is performed only on one subcarrier for each of the two OFDM symbols. A frequency of a subcarrier on which an OFDM symbol n−1 is modulated in $f_{n-1}$, and a complex symbol modulated on the subcarrier is $a_{n-1}e^{j\varphi_{n-1}}$. A frequency of a subcarrier on which an OFDM symbol n is modulated in $f_n$, and a complex symbol modulated on the subcarrier is $a_n e^{j\varphi_n}$. Each OFDM symbol includes two time segments, where $T_{cp}$ is a duration of a cyclic prefix, and $T_{os}$ is a duration of a remaining symbol.

Through comparison with the formula (1), an end moment of the OFDM symbol n−1 can be calculated as follows: $t_{n-1} = T_{cp} + T_{os} + t_{start,\ n-1}$; and an expression of a time-domain signal of the OFDM symbol n−1 is as follows:

$$s_{n-1}(T_{cp} + T_{os} + t_{start,n-1}) = a_{n-1}e^{j\varphi_{n-1}} e^{j[2\pi f_{n-1}(t - T_{cp} - t_{start,n-1})]} = a_{n-1}e^{j[2\pi f_{n-1}T_{os} + \varphi_{n-1}]} \quad \text{(Formula 3)}$$

A phase of the OFDM symbol n−1 is $2\pi f_{n-1}T_{os} + \varphi_{n-1}$, where $f_{n-1}$ is the frequency of the subcarrier on which the OFDM symbol n−1 is modulated, $T_{os}$ is a remaining duration of the OFDM symbol n−1 other than a duration of a cyclic prefix, and $\varphi_{n-1}$ is a transmission frequency used for the OFDM symbol n−1.

Similarly, through comparison with the formula (1), a start moment of the OFDM symbol n can be calculated as follows: $t_n = t_{start,n}$; and an expression of a time-domain signal of the OFDM symbol n is as follows:

$$s_n(t_{start,n}) = a_n e^{j\varphi_n} e^{j[2\pi f_n(t - T_{cp} - t_{start,n})]} = a_n e^{j[-2\pi f_n T_{cp} + \varphi_n]} \quad \text{(Formula 4)}$$

A phase of the OFDM symbol n is $-2\pi f_n T_{cp} + \varphi_n$, where $f_n$ is the frequency of the subcarrier on which the OFDM symbol n is modulated, $T_{cp}$ is a duration of a cyclic prefix of the OFDM symbol n, and $\varphi_n$ is a transmission frequency used for the OFDM symbol n.

If no limitation is specified, a phase at the end of a previous OFDM symbol may not be the same as a phase at the start of a next OFDM symbol, in other words, $2\pi f_{n-1} T_{OS} + \varphi_{n-1} \neq -2\pi f_n T_{cp} + \varphi_n$. Therefore, a phase jump occurs in a corresponding waveform.

Figure 8:
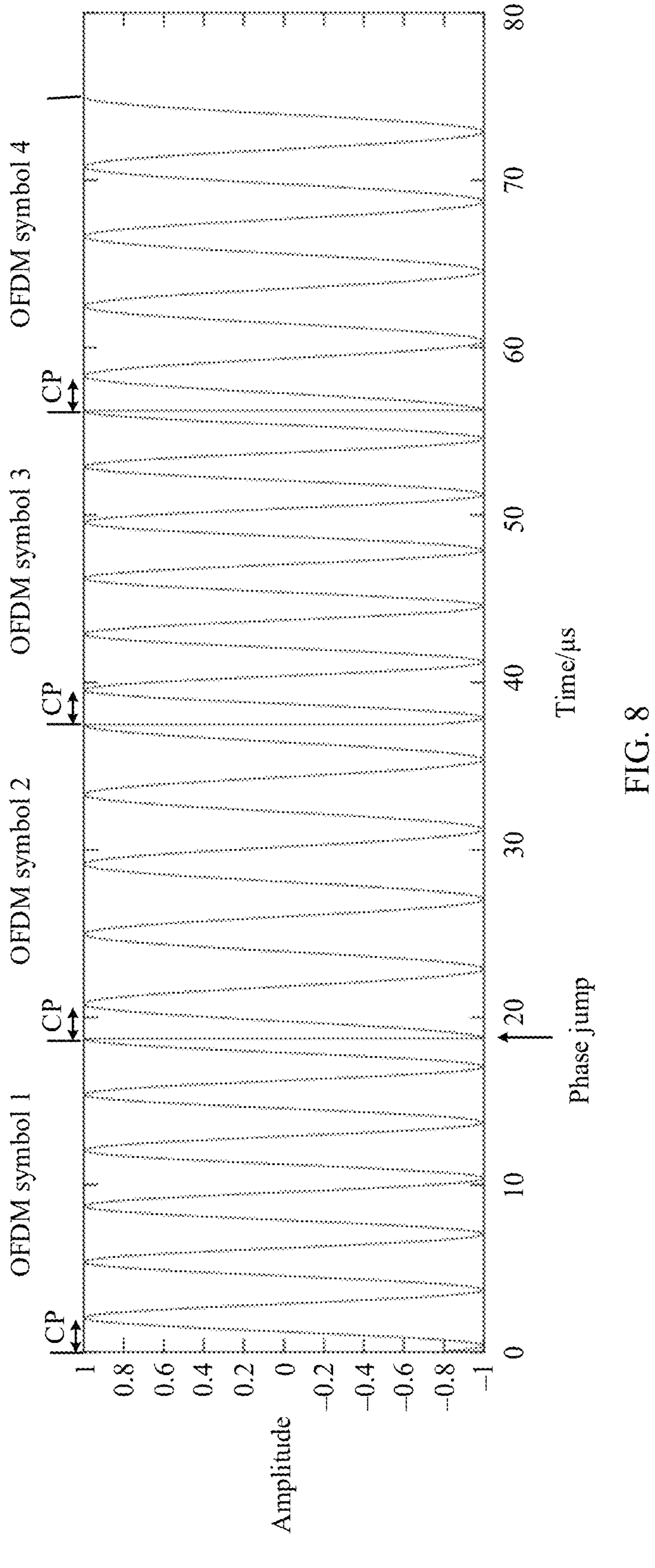
FIG. 8 is an FSK waveform generated by using an OFDM transmitter.

In an example, FIG. 8 is an FSK waveform generated by using an OFDM transmitter. As shown in FIG. 8, it can be learned that a phase jump of 180° occurs in the waveform at a boundary between two adjacent OFDM symbols. It should be understood that a large phase jump causes large out-of-band energy leakage of a spectrum. It is usually considered that a phase jump greater than 90° causes large out-of-band leakage.

Another problem is that a frequency jump occurs when an FSK signal is generated by using an OFDM transmitter. If different subcarriers are used for adjacent OFDM symbols, at a boundary between two OFDM symbols, a signal frequency jumps from a subcarrier frequency of a previous symbol to a subcarrier frequency of a next symbol.

From the perspective of signal processing, both a phase jump and a frequency jump cause out-of-band frequency leakage (out-of-band emission). In other words, although $N_{FSK}$ subcarriers are allocated for transmitting an FSK signal, large energy of a spectrum of an actual waveform is distributed out of an allocated bandwidth range. This causes severe interference to a signal transmitted on a neighboring frequency band.

Figure 9:
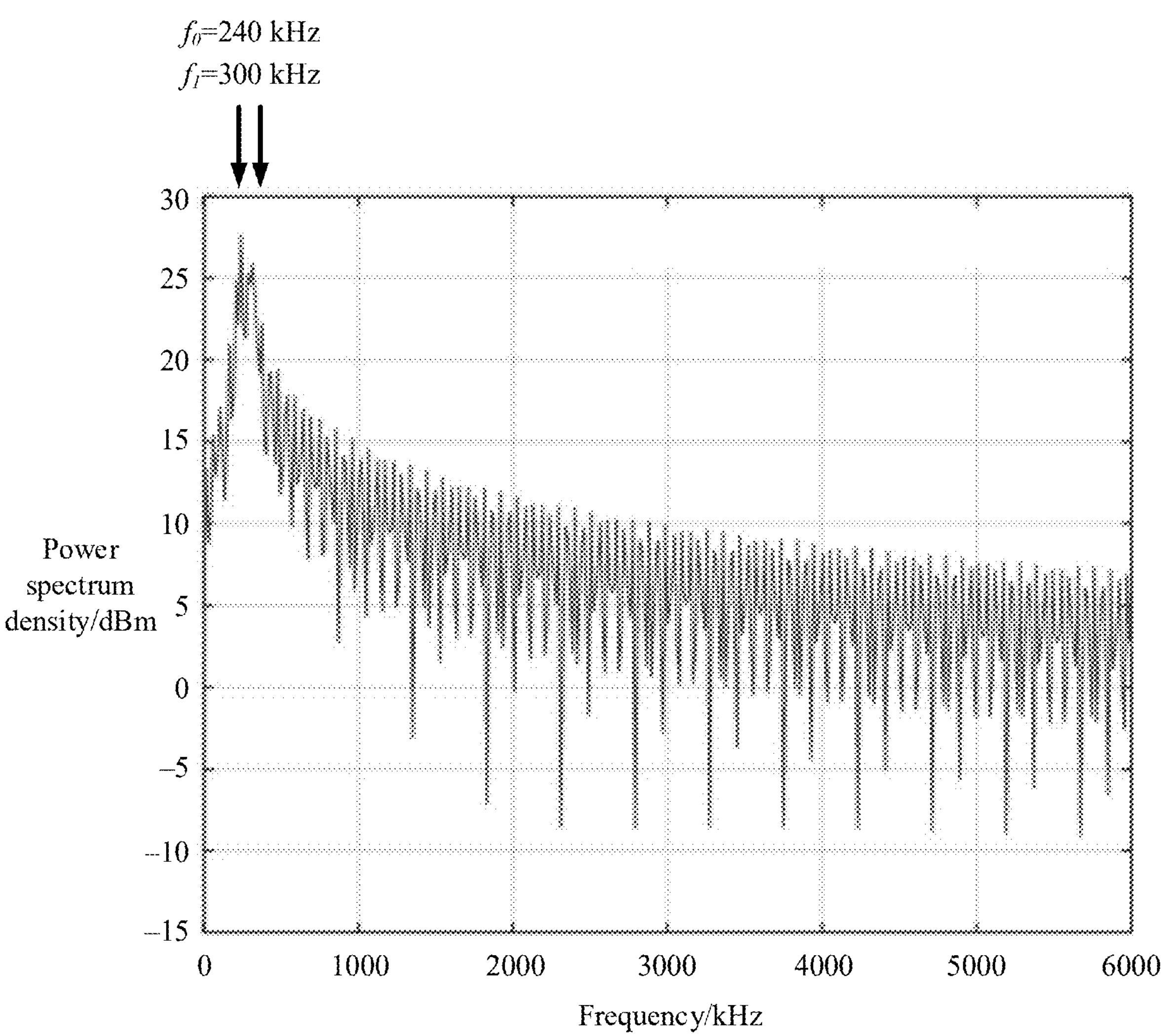
FIG. 9 is a diagram of a power spectrum of an FSK signal generated by using an OFDM transmitter.

In an example, FIG. 9 is a diagram of a power spectrum of an FSK signal generated by using an OFDM transmitter. In this example, an OFDM transmitter is used to generate an FSK signal, and only two subcarriers are used for FSK modulation. Frequencies of the subcarriers are as follows: $f_0$=240 kHz, and $f_1$=300 kHz. It can be learned from FIG. 9 that, although most energy is concentrated on an allocated frequency band, due to a phase jump and a frequency jump, spectrum leakage on the frequency band affects a frequency band far away. In other words, an out-of-band leakage problem occurs.

It can be understood that, during actual transmission of a signal, large energy of a spectrum of an actual waveform of the signal is distributed out of an allocated bandwidth range. Consequently, severe interference is caused to a signal transmitted on an adjacent frequency band, transmission of the signal on the adjacent frequency band is affected, and an out-of-band leakage problem occurs. As described above, for example, when an OFDM transmitter is used to generate an FSK signal, transmission of a signal on an adjacent frequency band may be affected due to a phase jump, a frequency jump, or other factors.

In view of this, this application provides a signal processing method and apparatus, to reduce interference caused by a signal under transmission to a signal transmitted on an adjacent frequency band. In this application, the foregoing problems are mainly resolved from two aspects. First, additional phase rotation is performed to ensure phase continuity between adjacent symbols and avoid a phase jump problem between adjacent symbols (for example, in FIG. 11), to reduce interference caused by a signal under transmission to a signal transmitted on an adjacent frequency band. Second, a frequency-gradient sequence is introduced to avoid a frequency jump between adjacent symbols (for example, in FIG. 13 and FIG. 19), to reduce interference caused by a signal under transmission to a signal transmitted on an adjacent frequency band.

The following describes in detail the signal processing method provided in embodiments of this application with reference to accompanying drawings. Embodiments provided in this application may be used in the network architecture shown in FIG. 1 and/or FIG. 2. This is not limited.

Figure 10:
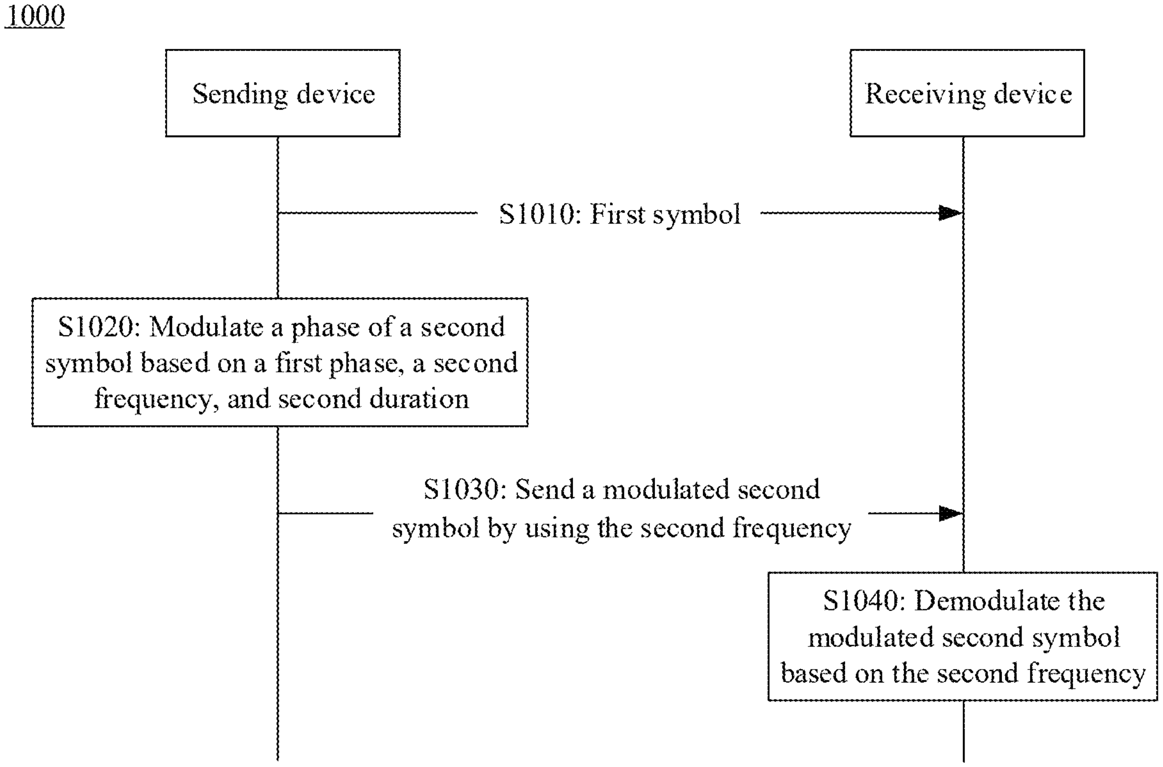
FIG. 10 is a schematic flowchart of a signal processing method according to an embodiment of this application.

FIG. 10 is a schematic flowchart of a signal processing method according to an embodiment of this application.

In an example, a sending device may be the network device 110 in FIG. 1, and a receiving device may be the terminal device 120 in FIG. 1.

In another example, a sending device may be the terminal device 210 in FIG. 2, and a receiving device may be the terminal device 220 in FIG. 2.

In still another example, a sending device may be the terminal device 220 in FIG. 2, and a receiving device may be the terminal device 210 in FIG. 2.

For example, as shown in FIG. 10, the signal processing method 1000 may include S1010 to S1040. The following describes S1010 to S1040 in detail.

In embodiments of this application, the sending device is the foregoing transmit-end device, and the receiving device is the foregoing receive-end device.

S1010: The sending device sends a first symbol. Correspondingly, the receiving device receives the first symbol.

For example, the first symbol may be the OFDM symbol n−1 in FIG. 7, namely, an $(n-1)^{th}$ OFDM symbol.

S1020: The sending device modulates a phase of a second symbol based on a first phase, a second frequency, and a second duration.

That the sending device modulates a phase of a second symbol based on a first phase, a second frequency, and a second duration may be understood as follows: The sending device determines a third phase based on the first phase, the second frequency, and the second duration, and modulates the phase of the second symbol based on the third phase, so that the phase of the second symbol is equal to the third phase, to obtain a modulated second symbol.

It can be understood that a difference between the modulated second symbol and the second symbol lies in that a phase of the modulated second symbol is different from the phase of the second symbol, and other characteristics (for example, the duration of a symbol) are the same. In other words, the duration of the modulated second symbol is the same as the duration of the second symbol, and a transmission frequency used for the modulated second symbol is also the same as a transmission frequency of the second symbol.

It should be understood that the sending device may determine the first phase, the second frequency, and the second duration.

For example, the sending device may determine the first phase.

The first phase is a phase at the end of the first symbol. The first phase may be, for example, φ(end, n−1).

It can be understood that, because a waveform of a sent signal is known to the sending device, the sending device can determine the phase at the end of the first symbol.

In an example, the first phase may be determined based on a second phase, a first frequency, and a first duration.

In embodiments of this application, the sending device may determine the second phase, where the second phase is a phase of the first symbol, for example, the second phase is $\varphi_{n-1}$; the sending device may determine the first frequency, where the first frequency is a transmission frequency used for the first symbol, for example, the first frequency is $f_{n-1}$; and the sending device may determine the first duration, where the first duration is a remaining duration of the first symbol without a cyclic prefix, for example, the second duration is T. In this case, the first phase is, for example, as follows: $\varphi(t_{end,n-1})=\varphi_{n-1}+2\pi f_{n-1}T_{os}$.

In another example, the first phase is the same as the second phase.

In an OFDM modulation scheme, if a remaining duration of each OFDM symbol is an integer multiple of a duration of a cycle of a subcarrier, in other words, $T_{os}=k\times 1/f_n$, where k is any integer, the phase at the end of the first symbol (for example, the OFDM symbol n−1) is the same as the phase of the first symbol, in other words, the first phase is the same as the second phase. The first phase may be as follows: $\varphi(t_{end,n-1})=\varphi_{n-1}$.

For example, the sending device may determine the second frequency.

The second frequency is the transmission frequency used for the second symbol, and the second symbol is a next symbol after the first symbol. It can be understood that the first symbol is a symbol that currently undergoes symbol modulation, and the second symbol may be, for example, the OFDM symbol n, namely, an $n^{th}$ OFDM symbol, in FIG. 7.

It should be noted that the sending device may determine, based on data that needs to be sent, a transmission frequency (namely, the second frequency) used for the second symbol. For example, the second frequency is $f_n$.

For example, if a modulation order of an FSK signal is 2, one symbol may carry one-bit information. In this case, it can be considered that bits of transmitted information include a sequence including "0" and "1", sending a first signal whose frequency is $f_0$ may indicate that "0" is transmitted, and sending a second signal whose frequency is $f_1$ may indicate that "1" is transmitted. The sending device may determine, based on whether data that needs to be sent is 0 or 1, whether the second frequency is $f_0$ or $f_1$.

For example, the sending device may determine the second duration.

The second duration is a duration of a cyclic prefix of the second symbol. For example, the second duration is $T_{cp,n}$. As shown in FIG. 7, the duration of the second symbol may include the second duration (namely, $T_{cp,n}$) and a remaining duration (namely, $T_{os,n}$).

In some embodiments, after determining the first phase, the second frequency, and the second duration, the sending device may determine the third phase based on the first phase, the second frequency, and the second duration, determine a modulated symbol based on the third phase, and send the modulated symbol to the receiving device by using the second frequency to carry the modulated symbol (in other words, using a second subcarrier to carry the modulated symbol). That the sending device modulates the phase of the second symbol may be understood as that the sending device modulates a phase of the modulated symbol carried at the second frequency.

It can be understood that the sending device may modulate a symbol on a subcarrier selected for the $n^{th}$ OFDM symbol, where a magnitude of a phase (namely, the third phase) of the modulated symbol is equal to a magnitude of the phase of the modulated second symbol. In embodiments of this application, the third phase, the phase of the modulated symbol, and the phase of the modulated second symbol are the same.

It should be noted that the sending device may determine the third phase based on the first phase, the second frequency, and the second duration. The third phase may be as follows: $\varphi_n=\varphi(t_{end,\ n-1})+2\pi f_n T_{cp,n}$.

In an example, the first phase may be as follows: $\varphi(t_{end,\ n-1})=\varphi_{n-1}+2\pi f_{n-1}T_{os}$. In this case, the third phase may be as follows: $\varphi_n=\varphi_{n-1}+2\pi f_{n-1}T_{os}+2\pi f_n T_{cp,n}$.

In another example, the first phase is as follows: $\varphi(t_{end,\ n-1})=\varphi_{n-1}$. In this case, the third phase is as follows: $\varphi_n=\varphi_{n-1}+2\pi f_{n-1}T_{cp,n}$.

For example, further, the sending device may determine the modulated symbol based on the third phase, and the modulated symbol may be, for example, $a_n e^{j\varphi_n}$.

It can be understood that, as shown in FIG. 7, if the phase (namely, the third phase) of the modulated second symbol is $\varphi_n$, a phase of the second symbol at a start position of the second symbol is $\varphi_n-2f_nT_{cp,n}$. The phase (for example, $\varphi_n-2\pi f_nT_{cp,n}$) at the start position of the second symbol is equal to a phase (for example, $\varphi(t_{end,\ n-1})$ at an end location of the first symbol, in other words, $\varphi_n-2\pi T_{cp,n}=\varphi(t_{end,\ n-1})$. Therefore, phase continuity between adjacent symbols can be maintained.

S1030: The sending device sends the modulated second symbol by using the second frequency. Correspondingly, the receiving device receives the modulated second symbol.

The modulated second symbol may be, for example, the OFDM symbol n, namely, the $n^{th}$ OFDM symbol, in FIG. 7.

It can be understood that the phase of the modulated second symbol has changed. The phase at the end of the first symbol may remain the same as a phase at the start of the modulated second symbol, so that the phase of the modulated second symbol and the phase of the first symbol are continuous.

S1040: The receiving device demodulates, based on the second frequency, the modulated second symbol that is received.

It should be understood that, after receiving the modulated second symbol, the receiving device may demodulate the modulated second symbol by using a demodulation technology based on the second frequency corresponding to the modulated second symbol, to obtain information that needs to be sent.

In embodiments of this application, the sending device may determine the third phase based on the first phase, the second frequency, and the second duration, and modulate the phase of the second symbol based on the third phase, so that the phase of the second symbol is equal to the third phase, to obtain the modulated second symbol. In terms of comparison between the second symbol and the modulated second symbol, the phase of the modulated second symbol has changed, so that phases between the modulated second symbol and the first symbol are continuous. In this way, phases between adjacent symbols are continuous, and no phase jump occurs. This can reduce interference caused by a signal under transmission to a signal transmitted on an adjacent frequency band.

Figure 11:
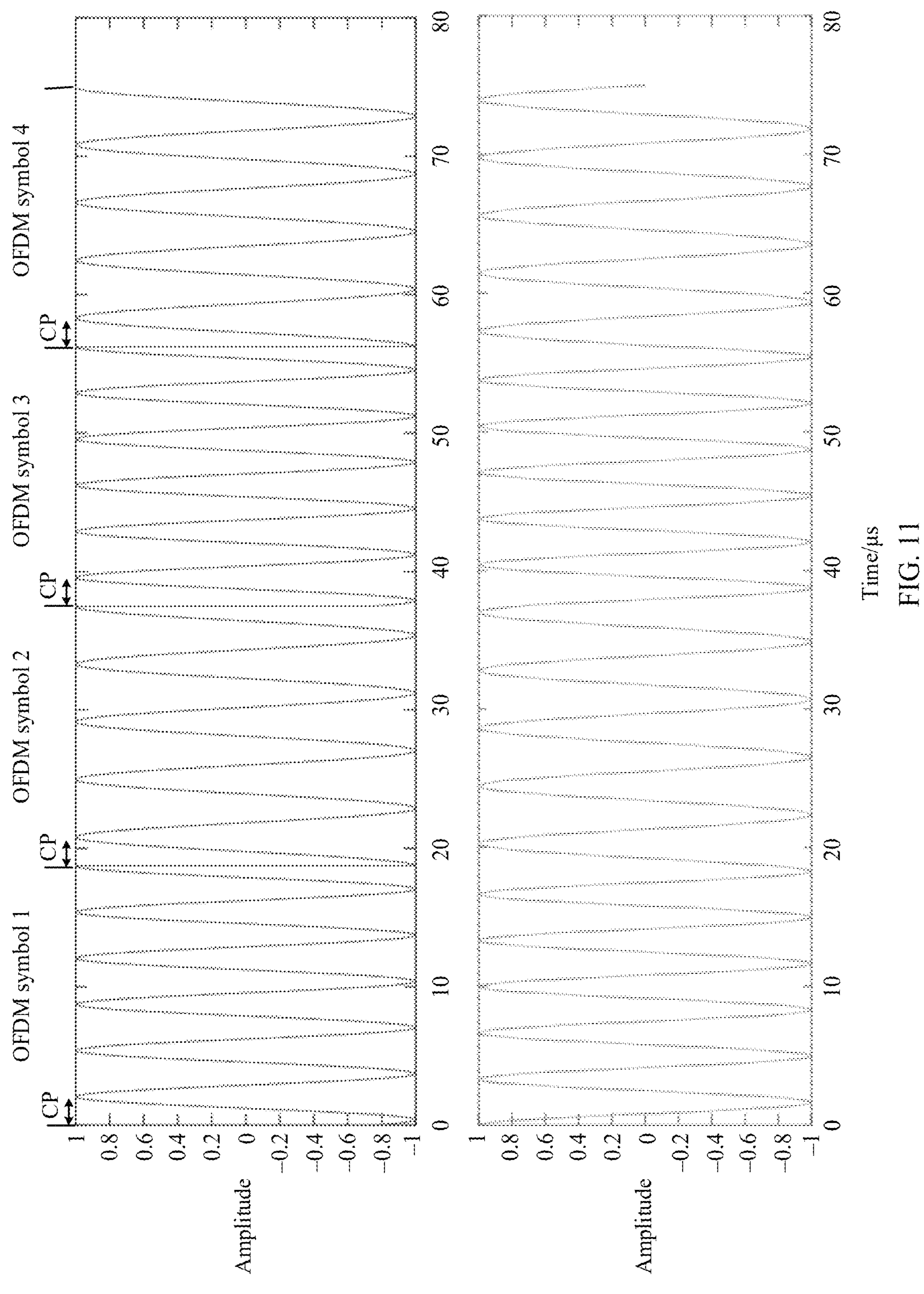
FIG. 11 is a diagram of FSK waveforms generated by using an OFDM transmitter in different manners.

In an example, FIG. 11 is a diagram of FSK waveforms generated by using an OFDM transmitter in different manners.

A diagram in an upper part of FIG. 11 is a diagram of an FSK waveform generated by using an OFDM transmitter in the conventional technology. It can be seen from the diagram that a phase jump occurs at a boundary (to be specific, in a CP) between two adjacent OFDM symbols among OFDM symbols, and a phase jump occurs in an FSK waveform.

A diagram in a lower part of FIG. 11 is a diagram of an FSK waveform generated by using an OFDM transmitter based on the signal processing method 1000 in embodiments of this application. It can be seen from the diagram here that no phase jump occurs at a boundary (in a CP) between two adjacent OFDM symbols among OFDM symbols, and no phase jump occurs in an FSK waveform.

Figure 12:
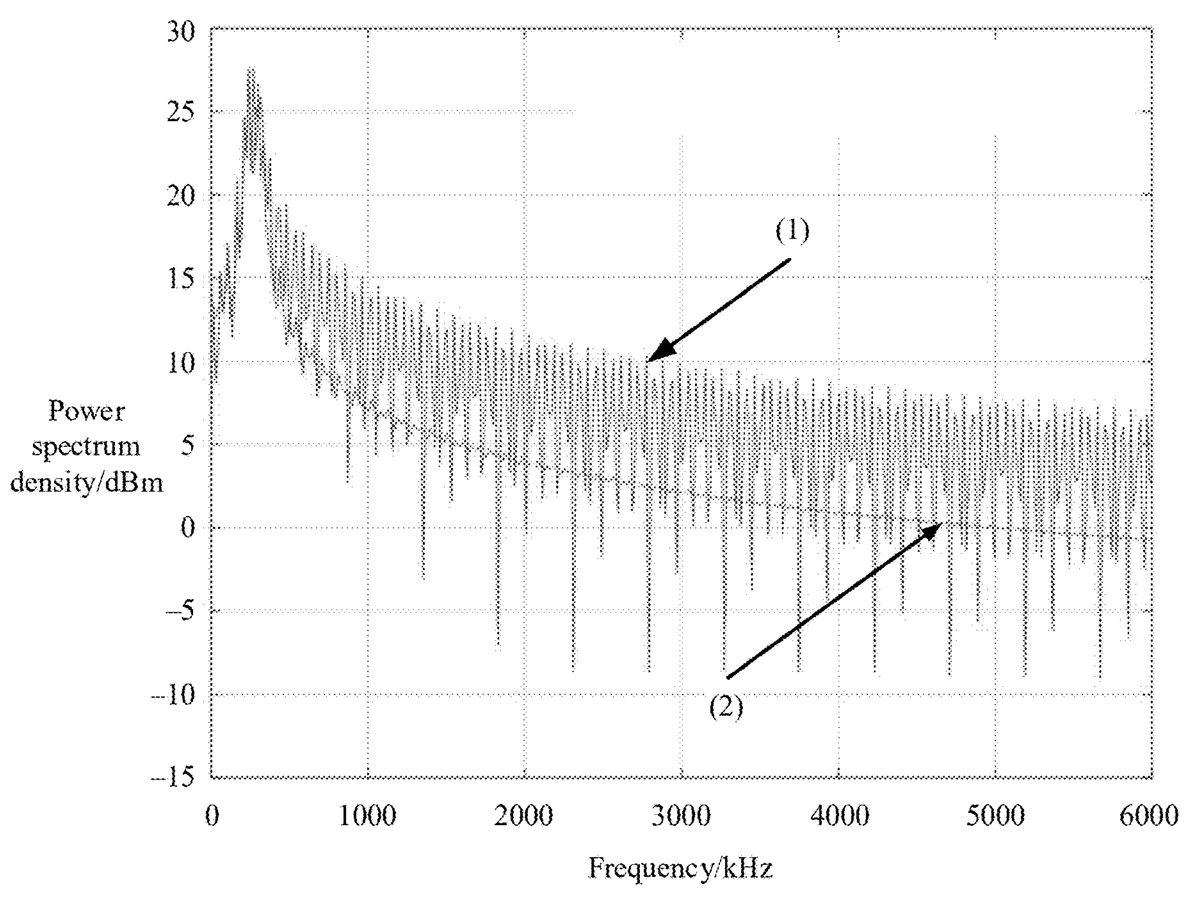
FIG. 12 is a diagram of power spectra of FSK signals generated by using an OFDM transmitter in different manners.

In an example, FIG. 12 is a diagram of power spectra of FSK signals generated by using an OFDM transmitter in different manners.

As shown in FIG. 12, a curve (1) in FIG. 12 is a diagram of a power spectrum of an FSK signal generated by using an OFDM transmitter in the conventional technology. It can be learned that, in the curve (1), although most energy is concentrated on an allocated frequency band, due to a phase jump, spectrum leakage on the frequency band affects a frequency band far away. A curve (2) in FIG. 12 is a diagram of a power spectrum of an FSK signal generated by using an OFDM transmitter based on the signal processing method 1000 in embodiments of this application. Because a phase jump is avoided, out-of-band leakage of a signal is significantly reduced, and interference caused by a signal under transmission to a signal transmitted on an adjacent frequency band is reduced.

As described above, another cause of out-of-band leakage is a frequency jump between adjacent symbols. Therefore, in embodiments of this application, another signal processing method provided in this application is described with reference to FIG. 13 to FIG. 17. The method is mainly implemented through a smooth frequency gradient between adjacent symbols.

Figure 13:
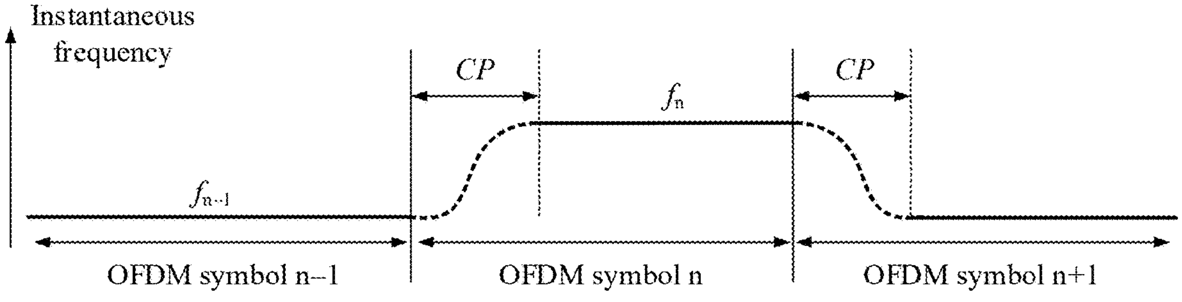
FIG. 13 is a diagram of smooth frequency switching.

In an example, FIG. 13 is a diagram of smooth frequency switching.

For a symbol generated by using an OFDM transmitter, in an OFDM symbol (namely, a remaining symbol) other than a CP part, a frequency of a modulated signal is determined by a used subcarrier, and therefore the frequency is a fixed value. Within a CP range between symbols, a frequency-gradient signal may be used, so that a frequency smoothly changes from a frequency used for a previous symbol to a frequency of a next symbol, to avoid a frequency jump.

As shown in FIG. 13, during generation of an OFDM symbol, at a position of a CP, an end part of the OFDM symbol is no longer copied to the front, but a frequency-gradient sequence is inserted, so that a frequency smoothly switches from a frequency of a previous symbol to a frequency of a current symbol.

Figure 14:
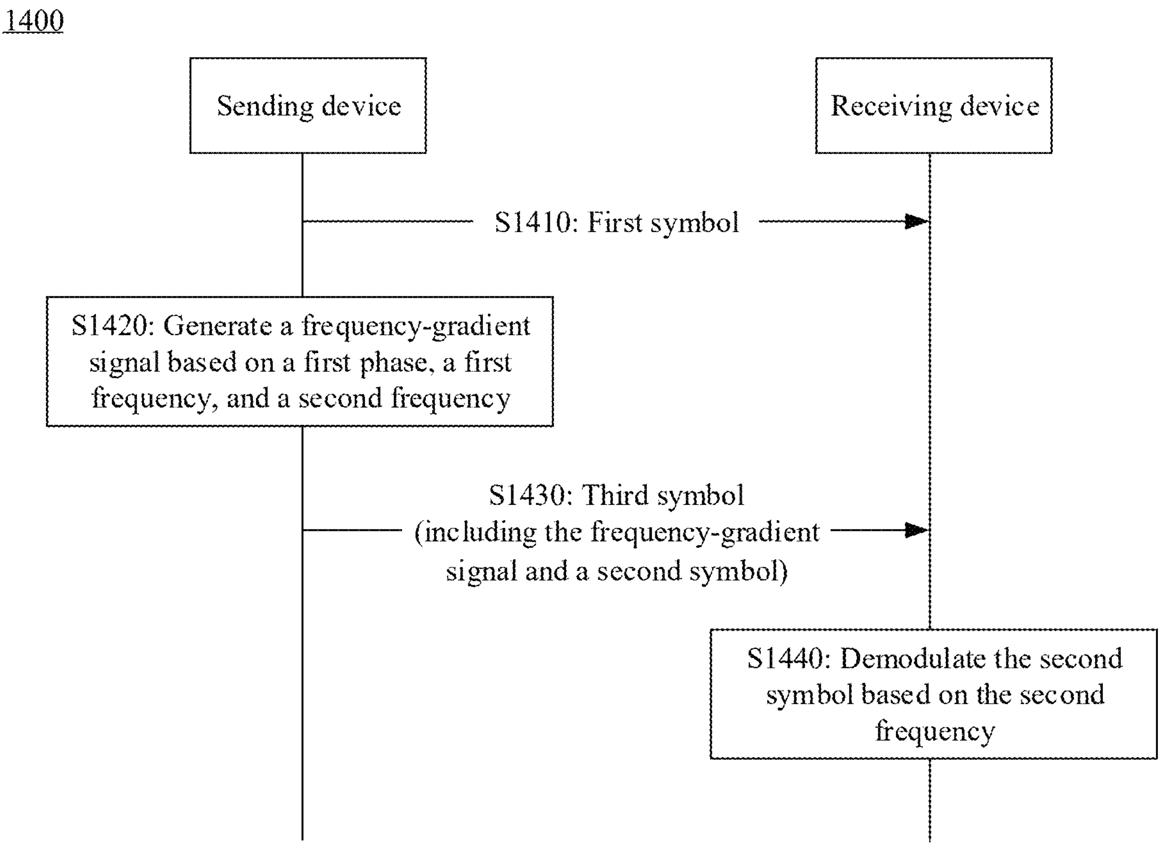
FIG. 14 is a schematic flowchart of another signal processing method according to an embodiment of this application.

FIG. 14 is a schematic flowchart of another signal processing method according to an embodiment of this application.

In an example, a sending device may be the network device 110 in FIG. 1, and a receiving device may be the terminal device 120 in FIG. 1.

In another example, a sending device may be the terminal device 210 in FIG. 2, and a receiving device may be the terminal device 220 in FIG. 2.

In still another example, a sending device may be the terminal device 220 in FIG. 2, and a receiving device may be the terminal device 210 in FIG. 2.

For example, as shown in FIG. 14, the signal processing method 1400 may include S1410 to S1440. The following describes S1410 to S1440 in detail.

In embodiments of this application, the sending device is the foregoing transmit-end device, and the receiving device is the foregoing receive-end device.

S1410: The sending device sends a first symbol. Correspondingly, the receiving device receives the first symbol.

For example, the first symbol may be the OFDM symbol n−1, namely, an $(n-1)^{th}$ OFDM symbol, in FIG. 7.

S1420: The sending device generates a frequency-gradient signal based on a first phase, a first frequency, and a second frequency.

The first phase is a phase at the end of the first symbol. The first frequency is a transmission frequency used for the first symbol. The second frequency is a transmission frequency used for a second symbol. The second symbol is a next symbol after the first symbol. For example, the second symbol may be the OFDM symbol n, namely, an $n^{th}$ OFDM symbol, in FIG. 7.

It can be understood that the frequency-gradient signal is determined based on a frequency-gradient sequence, the frequency-gradient sequence is determined based on an instantaneous frequency function and the first phase, the instantaneous frequency function is obtained based on a gradient frequency function, and the gradient frequency function is determined based on the first frequency, the second frequency, and a duration of a cyclic prefix of the second symbol.

In a possible implementation, S1420 may include S1420-1 to S1420-4.

S1420-1: The sending device determines the first phase, the first frequency, and the second frequency.

The first frequency is the transmission frequency used for the first symbol. For example, the first frequency is a frequency of a subcarrier used for the first symbol. For example, the first frequency is $f_{n-1}$.

The second frequency is the transmission frequency used for the second symbol. For example, the second frequency is a frequency of a subcarrier used for the second symbol. For example, the second frequency is $f_n$.

The first phase is the phase at the end of the first symbol. For example, the first phase may be $\varphi(t_{end,\ n-1})$.

In an example, the first phase may be determined based on a second phase, the first frequency, and a first duration. For content of this part, refer to S1020. Details are not described herein again.

In another example, the first phase is the same as the second phase. For content of this part, refer to S1020. Details are not described herein again.

S1420-2: The sending device determines the gradient frequency function based on the first frequency and the second frequency.

The gradient frequency function may be a smoothing curve such as a cosine function, a transformed function of a cosine function, or a hyperbolic tangent function.

For example, an example in which the gradient frequency function is a cosine function is used for description. The frequency gradient function may correspond to a dashed-line part in FIG. 13.

It is assumed that the gradient frequency function is $f_{transient}(t)$. An expression of the gradient frequency function may be as follows:

$$f_{transient}(t)=\frac{1}{2}\left[1-\cos\left(\frac{\pi t}{T_{cp}}\right)\right]\times(f_n-f_{n-1})+f_{n-1},\ 0\le t<T_{cp} \quad \text{(Formula 5)}$$

It can be learned from the formula 5 that the gradient frequency function may be determined based on the first frequency $f_{n-1}$, the second frequency $f_n$, and the duration $T_{cp}$ of the cyclic prefix of the second symbol.

Because this is in a digital signal processing part, a sampling sequence of $f_{transient}(t)$ is actually generated. The gradient frequency function may be converted into an instantaneous frequency (namely, a smooth gradient sequence). In other words, the instantaneous frequency function may be obtained based on the gradient frequency function.

$$f_{transient}(m)=\frac{1}{2}\left[1-\cos\left(\frac{\pi m}{f_s T_{cp}}\right)\right]\times(f_n-f_{n-1})+f_{n-1},\quad 0\le t<N_{cp} \quad \text{(Formula 6)}$$

$f_{transient}(m)$ is an instantaneous frequency, $f_s$ is a sampling rate, and $N_{cp}$ is a quantity of sampling points within duration of the CP.

S1420-3: The sending device generates the frequency-gradient sequence based on the instantaneous frequency function and the first phase.

For example, an expression of the frequency-gradient sequence may be as follows:

$$s(m)=e^{j\left[2\pi\frac{\sum_{l=1}^{m}f_{transient}(l)}{f_s}+\varphi_{n-1}\right]},\ 1\le m\le N_{cp} \quad \text{(Formula 7)}$$

It can be learned from the formula 7 that the frequency-gradient sequence s(m) may be determined based on the instantaneous frequency function $f_{transient}(t)$ and the first phase $\varphi_{n-1}$.

S1420-4: The sending device generates the frequency-gradient signal based on the frequency-gradient sequence.

For example, the sending device may place the frequency-gradient sequence s(m) in front of each OFDM symbol, at a position of a CP of each symbol, and perform digital-to-analog conversion on the sequence to generate the frequency-gradient signal.

It can be understood that the frequency-gradient sequence is inserted at a position of a CP of a symbol, so that a frequency smoothly switches from a frequency of a previous symbol to a frequency of a current symbol, for example, smoothly switches a frequency of the first symbol to a frequency of the second symbol, to avoid a frequency jump.

S1430: The sending device sends a third symbol. Correspondingly, the receiving device receives the third symbol.

The third symbol includes the frequency-gradient signal (for example, the CP part in FIG. 13) and the second symbol. The second symbol is connected to the first symbol through the frequency-gradient signal, and frequencies between the third symbol and the first symbol are continuous. The third symbol may be, for example, the OFDM symbol n, namely, an $n^{th}$ OFDM symbol, in FIG. 7.

It can be understood that the frequency-gradient signal is inserted at a position of a CP of the third symbol, so that frequencies between adjacent symbols change continuously, to avoid a frequency jump problem.

S1440: The receiving device demodulates the second symbol based on the second frequency.

It should be understood that, after receiving the third symbol, the receiving device may obtain the second symbol from the third symbol, and demodulate the second symbol by using a demodulation technology based on the second frequency corresponding to the second symbol, to obtain information that needs to be sent.

In embodiments of this application, during generation of an OFDM symbol, at a position of a CP, an end part of the OFDM symbol is no longer copied to the front, but a frequency-gradient sequence is inserted, so that a frequency smoothly switches from a frequency of a previous symbol to a frequency of a current symbol. This can reduce interference caused by a signal under transmission to a signal transmitted on an adjacent frequency band.

Figure 15:
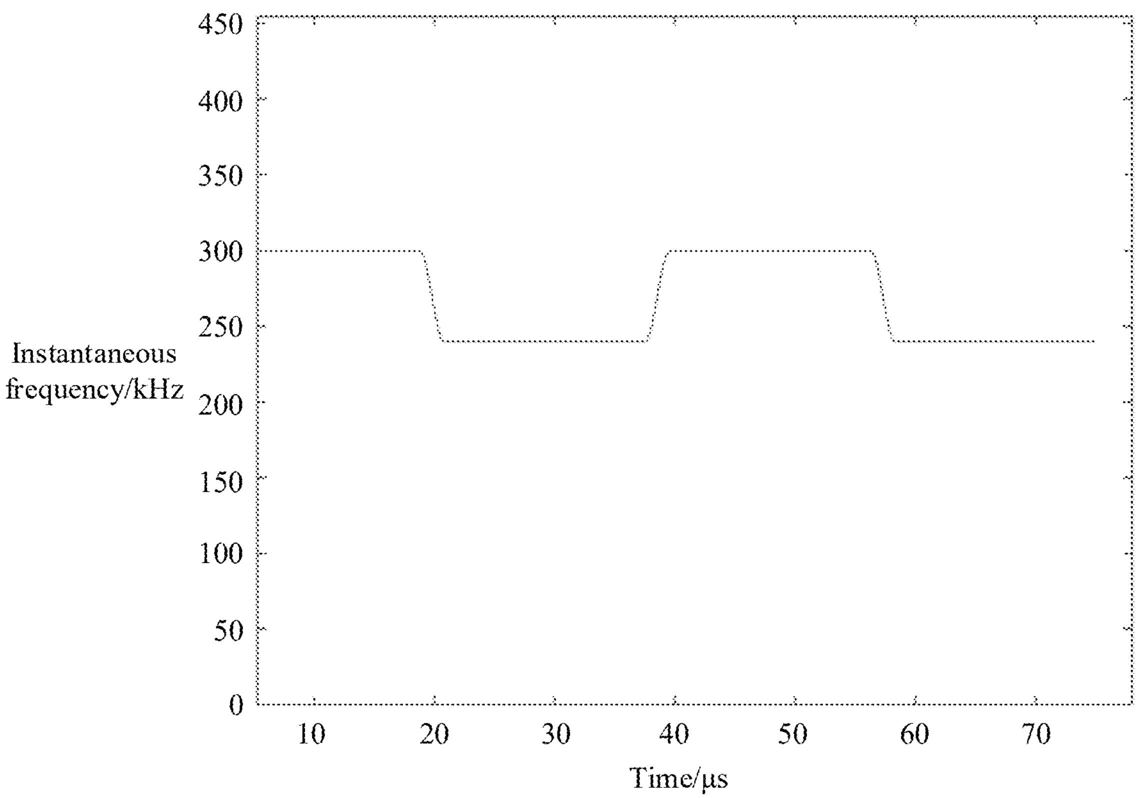
FIG. 15 is a diagram of a change of an instantaneous frequency with time.

In an example, FIG. 15 is a diagram of a change of an instantaneous frequency with time. It can be learned from FIG. 15 that a frequency does not directly jump between symbols, but gradually changes based on a smoothing function.

Figure 16:
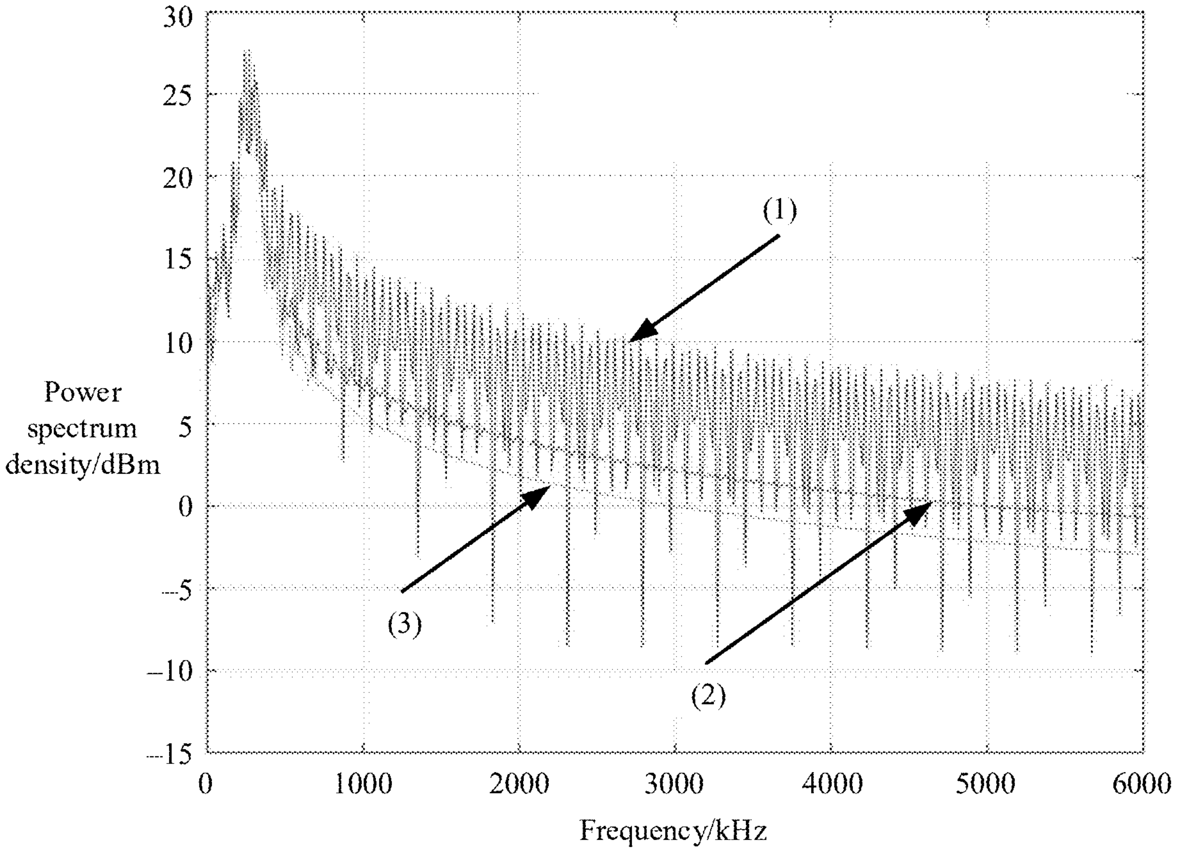
FIG. 16 is a diagram of power spectra of FSK signals generated by using an OFDM transmitter in different manners.

In an example, FIG. 16 is a diagram of power spectra of FSK signals generated by using an OFDM transmitter in different manners.

As shown in FIG. 16, a curve (1) in FIG. 16 is a diagram of a power spectrum of an FSK signal generated by using an OFDM transmitter in the conventional technology. It can be learned that, in the curve (1), although most energy is concentrated on an allocated frequency band, due to a phase jump, spectrum leakage on the frequency band affects a frequency band far away. A curve (2) in FIG. 16 is a diagram of a power spectrum of an FSK signal generated by using an OFDM transmitter based on the signal processing method 1000 in embodiments of this application. Because a phase jump is avoided, out-of-band leakage of a signal is significantly reduced. After the signal processing method 1000 is used, out-of-band energy leakage is significantly reduced in the curve (2). A curve (3) in FIG. 16 is a diagram of a power spectrum of an FSK signal generated by using an OFDM transmitter based on the signal processing method 1400 in embodiments of this application. It can be learned from the diagram that the signal processing method 1400 can have better out-of-band interference suppression effect.

Figure 17:
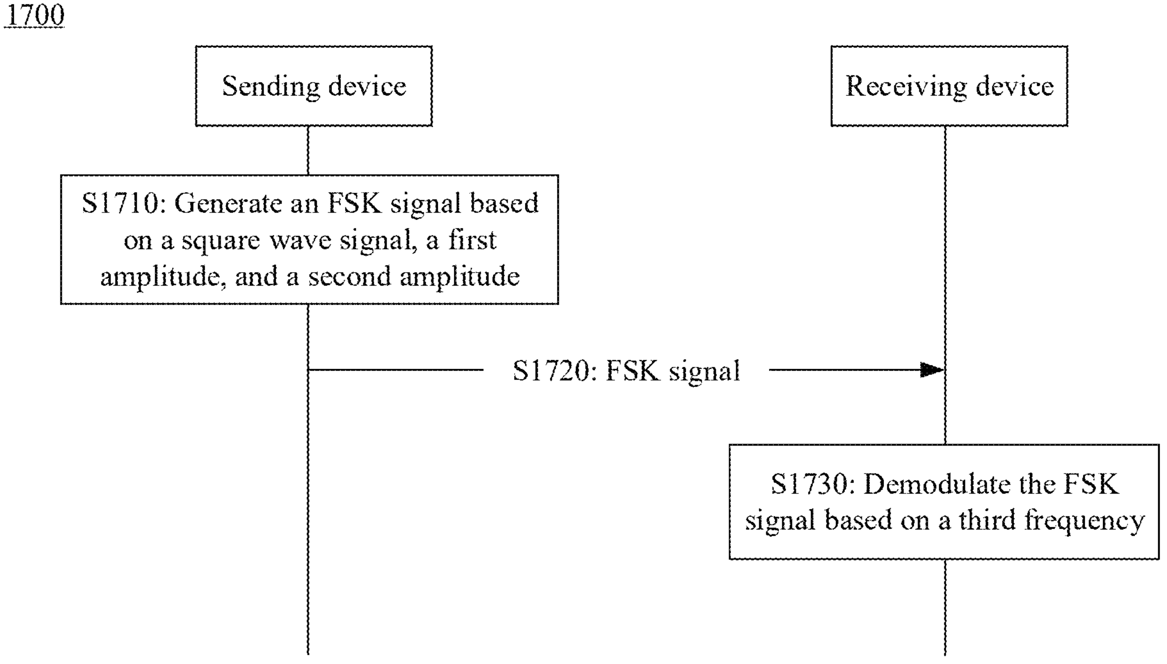
FIG. 17 is a schematic flowchart of another signal processing method according to an embodiment of this application.

FIG. 17 is a schematic flowchart of another signal processing method according to an embodiment of this application.

In an example, a sending device may be the network device 110 in FIG. 1, and a receiving device may be the terminal device 120 in FIG. 1.

In another example, a sending device may be the terminal device 210 in FIG. 2, and a receiving device may be the terminal device 220 in FIG. 2.

In still another example, a sending device may be the terminal device 220 in FIG. 2, and a receiving device may be the terminal device 210 in FIG. 2.

For example, as shown in FIG. 17, the signal processing method 1700 includes S1710 to S1730. The following describes S1710 to S1730 in detail.

In embodiments of this application, the sending device is the foregoing transmit-end device, and the receiving device is the foregoing receive-end device.

S1710: The sending device generates an FSK signal based on a square wave signal, a first amplitude, and a second amplitude.

The square wave signal is obtained by mapping data that needs to be sent. The data that needs to be sent includes first data and second data. The first data and the second data are to be sent adjacently in sequence. The first amplitude is an amplitude obtained by mapping the first data. The second amplitude is an amplitude obtained by mapping the second data.

It can be understood that the FSK signal is determined based on a first phase signal, the first phase signal is obtained through integration based on a first signal, the first signal includes the square wave signal and a gradient signal, and the gradient signal is determined based on the first amplitude, the second amplitude, and a time length of the gradient signal.

In a possible implementation, S1710 may include S1710-1 to S1710-5.

S1710-1: The sending device maps, to the square wave signal, the data that needs to be sent.

For example, the sending device may map, to the square wave signal in the following manner, the data that needs to be sent: mapping, to one amplitude based on a preset mapping table, every N bits in the data that needs to be sent; and determining the square wave signal based on an amplitude obtained through mapping, where $N=\log_2 M$, M is a modulation order of the FSK signal, and N is a natural number.

It is assumed that FSK modulation with M=2 is used, and the data that needs to be sent is a=[0, 1, 1, 0]. In this case, every $N=\log_2 M$ bits are mapped to one amplitude value. In other words, one bit is mapped to one amplitude value. For example, an amplitude sequence obtained through mapping by using a mapping relationship table shown in Table 1 is as follows: $\nu=[-1, 1, 1, -1]$.

TABLE 1

| Information bit | Mapped-to amplitude $\nu_n$ |
|---|---|
| 0 | −1 |
| 1 | 1 |

Figure 18:
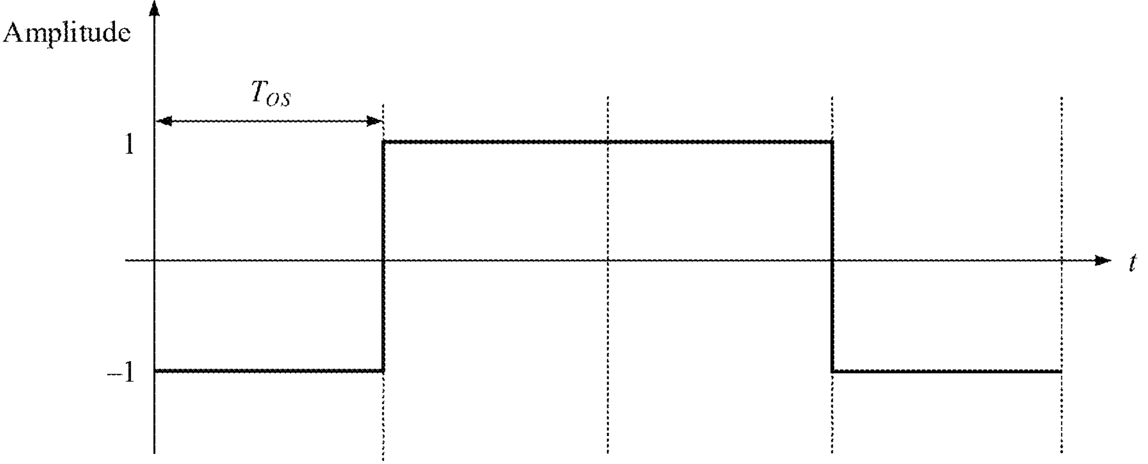
FIG. 18 is a diagram of a square wave signal generated by modulating information.

A square wave sequence generated based on the mapping relationship table shown in Table 1 is, for example, shown in FIG. 18. FIG. 18 is a diagram of a square wave signal generated by modulating information. A vertical coordinate is an amplitude value, and a horizontal coordinate is time. For example, a cycle of the square wave signal may be a remaining duration $T_{os}$ of an OFDM symbol.

S1710-2: The sending device determines the gradient signal.

The sending device may determine the first amplitude and the second amplitude, where the first amplitude is the amplitude obtained by mapping the first data, and the second amplitude is the amplitude obtained by mapping the second data. For example, the first amplitude may be $\nu_{n-1}$, and the second amplitude may be $\nu_n$.

The gradient signal may be generated by a smoothing function such as a cosine function or a hyperbolic tangent function.

For example, an example in which the gradient signal is a signal generated by a cosine function is used for description. An expression of the gradient signal may be as follows:

$$v_{transient,n}(t)=\frac{1}{2}\left[1-\cos\left(\frac{\pi t}{T_1}\right)\right]\times(v_n-v_{n-1})+v_{n-1},\ 0\le t<T_1 \quad \text{(Formula 8)}$$

It can be learned from the formula 8 that the gradient signal may be determined based on the first amplitude $\nu_{n-1}$, the second amplitude $\nu_n$, and the time length $T_1$ of the gradient signal. The time length of the gradient signal may be predefined. In some embodiments, the time length of the gradient function may be the same as a time length of a CP of the OFDM symbol, in other words, $T_1=T_{cp}$.

S1710-3: The sending device inserts the gradient signal between adjacent square wave signals to form the first signal.

It can be understood that the square wave signal and the gradient signal may form the first signal, and the first signal may be denoted as $\nu_f(\tau)$.

Figure 19:
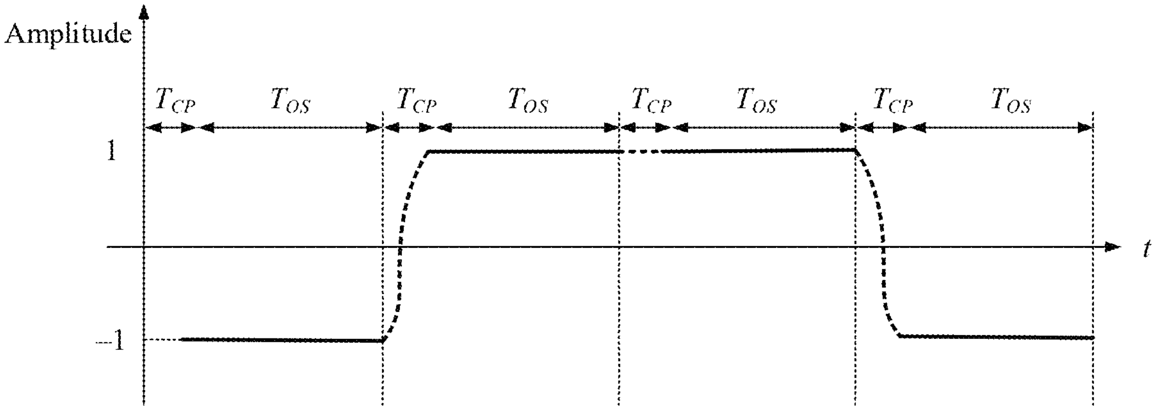
FIG. 19 is a diagram of a waveform obtained by inserting a gradient signal between square wave signals.

For example, FIG. 19 is a diagram of a waveform obtained by inserting a gradient signal between square wave signals. It can be learned from FIG. 19 that a gradient signal with a time length of $T_{cp}$ is inserted between square wave signals shown in FIG. 18, to form a first signal shown in FIG. 19.

S1710-4: The sending device performs integration on the first signal to obtain the first phase signal.

For example, the sending device may perform integration on the first signal $\nu_f(\tau)$ to obtain a first phase signal $$\int_{-\infty}^{t} v_f(\tau)d\tau.$$

S1710-5: The sending device determines the FSK signal based on the first phase signal.

The sending device may determine the FSK signal based on the first phase signal. For example, the sending device may determine the FSK signal in a manner shown in a formula 9.

$$s_{FSK}(t)=\cos\left(2\pi h\int_{-\infty}^{t} v_f(\tau)d\tau\right) \quad \text{(Formula 9)}$$

In the formula 9, h is a constant, and may be referred to as a modulation coefficient. It can be learned from the formula 9 that the FSK signal may be determined based on the first signal $\nu_f(\tau)$.

S1720: The sending device sends the FSK signal. Correspondingly, the receiving device receives the FSK signal.

S1730: The receiving device demodulates the FSK signal based on a third frequency.

It should be understood that, after receiving the FSK signal, the receiving device may demodulate the FSK signal by using a demodulation technology based on a frequency (namely, the third frequency) of the signal, to obtain information that needs to be sent, where the third frequency is directly proportional to an amplitude of the square wave signal.

In embodiments of this application, a gradient signal is inserted between square wave signals, so that a frequency smoothly switches from a frequency of a previous signal to a frequency of a current signal, to avoid a sudden frequency change. This can reduce interference caused by a signal under transmission to a signal transmitted on an adjacent frequency band.

Corresponding to the methods provided in the foregoing method embodiments, embodiments of this application further provide a corresponding apparatus. The apparatus includes a corresponding module for performing the foregoing method embodiments. The module may be software, hardware, or a combination of software and hardware. It can be understood that the technical features described in the foregoing method embodiments are also applicable to the following apparatus embodiments.

Figure 20:
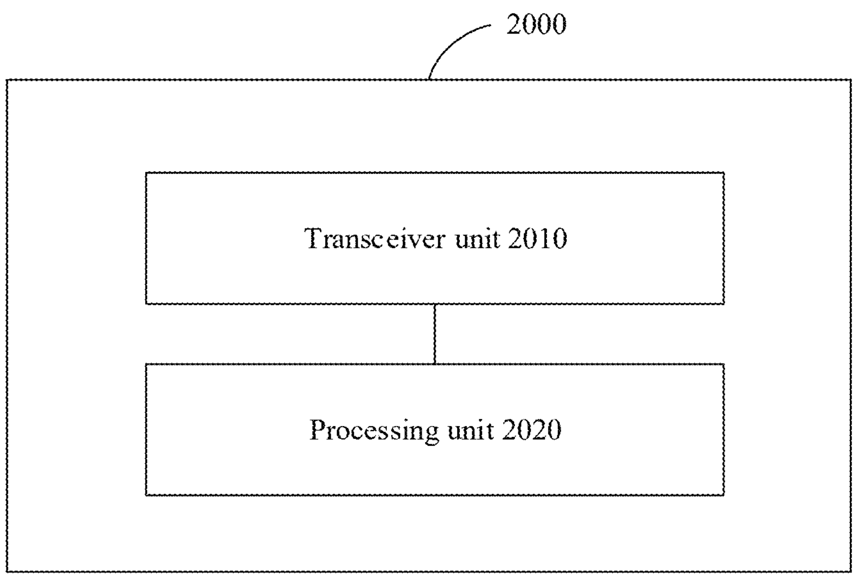
FIG. 20 is a block diagram of a signal processing apparatus according to an embodiment of this application.

FIG. 20 is a block diagram of a signal processing apparatus according to an embodiment of this application.

For example, the apparatus 2000 may be disposed in the sending device or the receiving device in the foregoing embodiments.

For example, as shown in FIG. 20, the apparatus 2000 includes a transceiver unit 2010, and the transceiver unit 2010 may communicate with the outside. The transceiver unit 2010 may also be referred to as a communication interface or a communication unit. The apparatus 2000 may further include a processing unit 2020, configured to process data.

In some embodiments, the apparatus 2000 may further include a storage unit. The storage unit may be configured to store instructions and/or data. The processing unit 2020 may read the instructions and/or the data in the storage unit.

In a possible implementation, the apparatus 2000 may be configured to perform an action performed by the sending device in the foregoing method embodiments. In this case, the apparatus 2000 may be the sending device or a component that can be configured in the sending device, the transceiver unit 2010 is configured to perform a sending/receiving-related operation on the sending device side in the foregoing method embodiments, and the processing unit 2020 is configured to perform a processing-related operation on the sending device side in the foregoing method embodiments.

In some embodiments, the transceiver unit 2010 is configured to send a first symbol. The processing unit 2020 is configured to modulate a phase of a second symbol based on a first phase, a second frequency, and a second duration, where the second symbol is a next symbol after the first symbol, the first phase is a phase at the end of the first symbol, the second frequency is a transmission frequency used for the second symbol, and the second duration is a duration of a cyclic prefix of the second symbol. The transceiver unit 2010 is further configured to send a modulated second symbol by using the second frequency, where phases between the modulated second symbol and the first symbol are continuous.

In some embodiments, the processing unit 2020 is further configured to: determine a third phase based on the first phase, the second frequency, and the second duration; and determine a modulated symbol based on the third phase.

In some other embodiments, the transceiver unit 2010 is configured to send a first symbol. The processing unit 2020 is configured to generate a frequency-gradient signal based on a first phase, a first frequency, and a second frequency, where the first phase is a phase at the end of the first symbol, the first frequency is a transmission frequency used for the first symbol, the second frequency is a transmission frequency used for a second symbol, and the second symbol is a next symbol after the first symbol. The transceiver unit 2010 is further configured to send a third symbol, where the third symbol includes the frequency-gradient signal and the second symbol, the second symbol is connected to the first symbol through the frequency-gradient signal, and frequencies between the third symbol and the first symbol are continuous.

In still some other embodiments, the processing unit 2020 is configured to generate a frequency shift keying FSK signal based on a square wave signal, a first amplitude, and a second amplitude, where the square wave signal is obtained by mapping data that needs to be sent, the data that needs to be sent includes first data and second data, the first data and the second data are to be sent adjacently in sequence, the first amplitude is an amplitude obtained by mapping the first data, and the second amplitude is an amplitude obtained by mapping the second data. The transceiver unit 2010 is configured to send the FSK signal.

In another possible implementation, the apparatus 2000 may be configured to perform an action performed by the receiving device in the foregoing method embodiments. In this case, the apparatus 2000 may be the receiving device or a component that can be configured in the receiving device, the transceiver unit 2010 is configured to perform a sending/receiving-related operation on the receiving device side in the foregoing method embodiments, and the processing unit 2020 is configured to perform a processing-related operation on the receiving device side in the foregoing method embodiments.

For example, the transceiver unit 2010 is configured to receive a second symbol, and the processing unit 2020 is configured to demodulate the second symbol based on a second frequency.

For more detailed descriptions of the apparatus 2000, refer to related descriptions in the foregoing method embodiments. Details are not described herein again.

It should be understood that the apparatus 2000 herein is embodied in a form of a functional unit. The term "unit" herein may indicate an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art can understand that the apparatus 2000 may be the terminal device in the foregoing embodiments, and may be configured to perform the processes and/or the operations corresponding to the terminal device in the foregoing method embodiments. To avoid repetition, details are not described herein again.

The apparatus 2000 in the foregoing solutions has a function of implementing corresponding operations performed by a device (for example, the terminal device or the network device) in the foregoing methods. The function may be implemented by hardware, or may be implemented by hardware executing corresponding software. The hardware or the software includes one or more modules corresponding to the foregoing functions. For example, the transceiver unit may be replaced with a transceiver (for example, a sending unit in the transceiver unit may be replaced with a transmitter, and a receiving unit in the transceiver unit may be replaced with a receiver), and another unit, for example, the processing unit, may be replaced with a processor, to separately perform sending and receiving operations and a related processing operation in the method embodiments.

In addition, the transceiver unit 2010 may alternatively be a transceiver circuit (for example, may include a receiver circuit and a transmitter circuit), and the processing unit may be a processing circuit.

It should be noted that the apparatus in FIG. 20 may be a network element or a device in the foregoing embodiments, or may be a chip or a chip system, for example, a system on chip (SoC). The transceiver unit may be an input/output circuit or a communication interface. The processing unit is a processor, a microprocessor, or an integrated circuit that is integrated on the chip. This is not limited herein.

Figure 21:
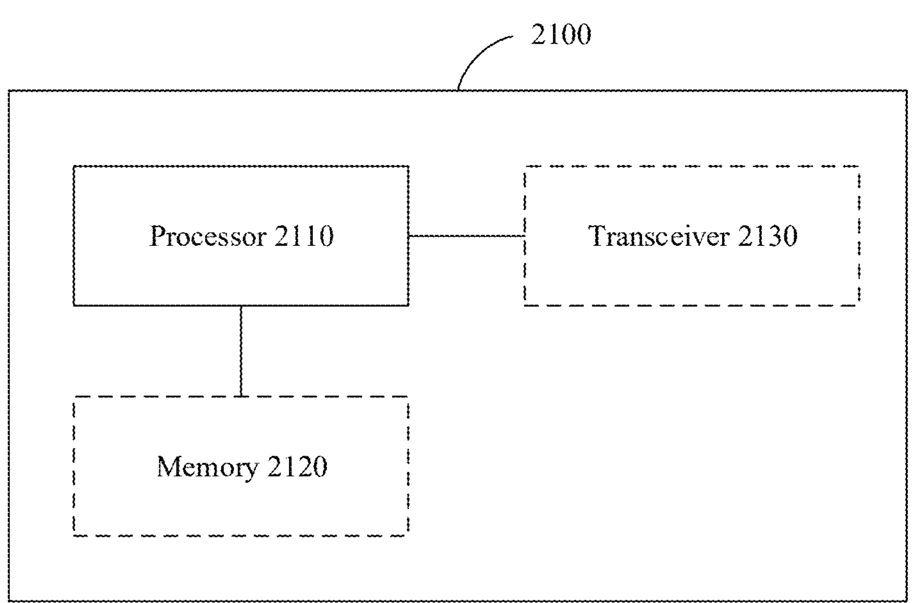
FIG. 21 is a block diagram of another signal processing apparatus according to an embodiment of this application.

FIG. 21 is a block diagram of another communication apparatus according to an embodiment of this application. The apparatus 2100 includes a processor 2110. The processor 2110 is coupled to a memory 2120. The memory 2120 is configured to store a computer program or instructions and/or data. The processor 2110 is configured to execute the computer program or the instructions stored in the memory 2120, or read the data stored in the memory 2120, to perform the methods in the foregoing method embodiments.

In some embodiments, there is one or more processors 2110.

In some embodiments, there is one or more memories 2120.

In some embodiments, the memory 2120 and the processor 2110 are integrated together, or are disposed separately.

In some embodiments, as shown in FIG. 21, the apparatus 2100 further includes a transceiver 2130. The transceiver 2130 is configured to send and/or receive a signal. For example, the processor 2110 is configured to control the transceiver 2130 to send and/or receive a signal.

In a solution, the apparatus 2100 is configured to implement an operation performed by a device (for example, the terminal device, or for another example, the network device) in the foregoing method embodiments.

For example, the processor 2110 is configured to execute the computer program or the instructions stored in the memory 2120, to implement the operations related to the network device in the foregoing method embodiments.

For another example, the processor 2110 is configured to execute the computer program or instructions stored in the memory 2120, to implement the operations related to the terminal device in the foregoing method embodiments.

It should be understood that the processor mentioned in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example rather than limitation, the RAM includes a plurality of forms, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a DSP, an ASIC, an FPGA or another programmable logic device, a discrete gate or a transistor logic device, or a discrete hardware component, the memory (a storage module) may be integrated into the processor.

It should be further noted that the memory described in this specification is intended to include but is not limited to these memories and any other appropriate type of memory.

An embodiment of this application further provides a computer-readable storage medium. The computer-readable storage medium stores computer instructions for implementing a method performed by a device (for example, the terminal device, or for another example, the network device) in the foregoing method embodiments.

For example, when the computer program is executed by a computer, the computer is enabled to implement the method performed by the network device in the foregoing method embodiments.

For another example, when the computer program is executed by a computer, the computer is enabled to implement the method performed by the terminal device in the foregoing method embodiments.

An embodiment of this application further provides a computer program product, including instructions. When the instructions are executed by a computer, a method performed by a device (for example, the terminal device, or for another example, the network device) in the foregoing method embodiments is implemented.

An embodiment of this application provides a communication system, including a sending device and a receiving device. The system is configured to perform the technical solutions in the foregoing embodiments. An implementation principle and technical effect of the system are similar to those of the foregoing method-related embodiments. Details are not described herein again.

An embodiment of this application provides a chip. The chip is configured to execute instructions. When the chip runs, the technical solutions in the foregoing embodiments are performed. An implementation principle and technical effect of the chip are similar. Details are not described herein again.

For descriptions and benefits of related content of any one of the apparatuses provided above, refer to a corresponding method embodiment provided above. Details are not described herein again.

Units and algorithm operations in examples described with reference to embodiments disclosed in this specification can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

For detailed working processes of the foregoing system, apparatus, and unit, reference may be made to corresponding processes in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components shown as units may or may not be physical units, for example, may be located in one place, or may be distributed on a plurality of network units. Some or all of the units may be selected according to actual requirements to achieve objectives of solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application essentially, or a part contributing to the conventional technology, or some of technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The storage medium includes any medium that can store program code, for example, a USB flash drive, a removable hard disk, a ROM, a RAM, a magnetic disk, or an optical disc.

The foregoing descriptions are merely some implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal processing method, the method comprising:
sending a first symbol;
modulating a phase of a second symbol based on a first phase, a second frequency, and a second duration, wherein the second symbol is a next symbol after the first symbol, the first phase is a phase at the end of the first symbol, the second frequency is a transmission frequency utilized for the second symbol, and the second duration is a duration of a cyclic prefix of the second symbol; and
sending a modulated second symbol by utilizing the second frequency, wherein phases between the modulated second symbol and the first symbol are continuous.

2. The method according to claim 1, wherein the first phase is determined based on a second phase, a first frequency, and a first duration, the second phase is a phase of the first symbol, the first frequency is a transmission frequency utilized for the first symbol, and the first duration is a remaining duration of the first symbol without a cyclic prefix.

3. The method according to claim 1, wherein the first phase is same as a second phase, and the second phase is a phase of the first symbol.

4. The method according to claim 1, wherein the second frequency is determined based on data that is to be sent.

5. The method according to claim 1, wherein the first symbol and the second symbol are orthogonal frequency division multiplexing (OFDM) symbols.

6. The method according to claim 1, wherein a phase of the modulated second symbol is different from the phase of the second symbol.

7. The method according to claim 6, wherein a duration of the modulated second symbol is same as a duration of the second symbol.

8. A signal processing method, the method comprising:
receiving a first symbol;
receiving a modulated second symbol, wherein the modulated second symbol is modulated based on a first phase, a second frequency, and a second duration, the first phase is a phase at the end of the first symbol, the second frequency is a transmission frequency utilized for the second symbol, the second duration is a duration of a cyclic prefix of the second symbol, phases between the modulated second symbol and the first symbol are continuous, and the modulated second symbol is a next symbol after the first symbol; and
demodulating the modulated second symbol based on the second frequency.

9. The method according to claim 8, wherein the first phase is determined based on a second phase, a first frequency, and first a duration, the second phase is a phase of the first symbol, the first frequency is a transmission frequency utilized for the first symbol, and the first duration is a remaining duration of the first symbol without a cyclic prefix.

10. The method according to claim 8, wherein the first phase is same as a second phase, and the second phase is a phase of the first symbol.

11. The method according to claim 8, wherein the second frequency is determined based on data that is to be sent.

12. The method according to claim 8, wherein the first symbol and the second symbol are orthogonal frequency division multiplexing (OFDM) symbols.

13. The method according to claim 8, wherein a phase of the modulated second symbol is different from the phase of the second symbol, and a duration of the modulated second symbol is same as a duration of the second symbol.

14. A signal processing apparatus, comprising a processor, wherein the processor is configured to execute a computer program or instructions stored in non-transitory computer readable storage medium, to:
send a first symbol;
modulate a phase of a second symbol based on a first phase, a second frequency, and a second duration, wherein the second symbol is a next symbol after the first symbol, the first phase is a phase at the end of the first symbol, the second frequency is a transmission frequency utilized for the second symbol, and the second duration is a duration of a cyclic prefix of the second symbol; and
send a modulated second symbol by utilizing the second frequency, wherein phases between the modulated second symbol and the first symbol are continuous.

15. The apparatus according to claim 14, wherein the first phase is determined based on a second phase, a first frequency, and a first duration, the second phase is a phase of the first symbol, the first frequency is a transmission frequency utilized for the first symbol, and the first duration is a remaining duration of the first symbol without a cyclic prefix.

16. The apparatus according to claim 14, wherein the first phase is same as a second phase, and the second phase is a phase of the first symbol.

17. The apparatus according to claim 14, wherein the second frequency is determined based on data that is to be sent.

18. The apparatus according to claim 14, wherein the first symbol and the second symbol are orthogonal frequency division multiplexing (OFDM) symbols.

19. The apparatus according to claim 14, wherein a phase of the modulated second symbol is different from the phase of the second symbol.

20. The apparatus according to claim 19, wherein a duration of the modulated second symbol is same as a duration of the second symbol.

* * * * *